(12) United States Patent
Kiyohara et al.

(10) Patent No.: US 8,289,391 B2
(45) Date of Patent: Oct. 16, 2012

(54) APPARATUS FOR VEHICLE SURROUNDINGS MONITORING

(75) Inventors: Masahiro Kiyohara, Hitachinaka (JP); Ryo Yumiba, Hitachi (JP); Kota Irie, Sagamihara (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 12/859,020

(22) Filed: Aug. 18, 2010

(65) Prior Publication Data

US 2011/0074957 A1    Mar. 31, 2011

(30) Foreign Application Priority Data

Sep. 30, 2009   (JP) ................................ 2009-226373

(51) Int. Cl.
*H04N 9/47* (2006.01)
(52) U.S. Cl. ........................ 348/148; 348/153
(58) Field of Classification Search .................. 348/148, 348/153
See application file for complete search history.

(56) References Cited

U.S. PATENT DOCUMENTS

| | | | |
|---|---|---|---|
| 5,961,571 A | 10/1999 | Gorr et al. | |
| 6,734,896 B2 * | 5/2004 | Nobori et al. | 348/148 |
| 7,139,412 B2 * | 11/2006 | Kato et al. | 382/104 |
| 7,454,128 B2 * | 11/2008 | Lang et al. | 396/5 |
| 7,726,434 B2 * | 6/2010 | Pochmuller | 180/281 |
| 8,044,789 B2 * | 10/2011 | Daura Luna et al. | 340/463 |
| 2002/0196340 A1 | 12/2002 | Kato et al. | |
| 2006/0203092 A1 | 9/2006 | Nobori et al. | |
| 2007/0225913 A1 | 9/2007 | Ikeda et al. | |
| 2009/0085923 A1 | 4/2009 | Nakanishi et al. | |

FOREIGN PATENT DOCUMENTS

| | | |
|---|---|---|
| EP | 1 775 691 A1 | 4/2007 |
| JP | 11-339194 A | 12/1999 |
| JP | 3297040 B1 | 4/2002 |
| JP | 2004-96488 A | 3/2004 |
| WO | WO 2004/034183 A2 | 4/2004 |
| WO | WO 2006/022630 A1 | 3/2006 |

OTHER PUBLICATIONS

European Search Report dated Mar. 16, 2011 (three (3) pages).

* cited by examiner

*Primary Examiner* — David Lazaro
*Assistant Examiner* — Marie Georges Henry
(74) *Attorney, Agent, or Firm* — Crowell & Moring LLP

(57) ABSTRACT

There is provided apparatus for vehicle surroundings monitorings that assists so as to make it possible for a driver to check the periphery of the vehicle with ease. Plural images are obtained by capturing the periphery of the vehicle with mutually differing exposure. A process of image recognition is then performed for a target within the thus obtained images. The images are then compared, and images for which the accuracy of image recognition of the target is favorable are selected from among the images. The selected images are joined and composited to generate a host vehicle periphery composite image. Thus, an image with a wide dynamic range and high visibility is generated, thereby making it easier for the driver to check the periphery of the vehicle.

12 Claims, 18 Drawing Sheets

APPARATUS FOR VEHICLE SURROUNDINGS MONITORING

BACKGROUND OF THE INVENTION

1. Field of the Invention

The present invention relates to apparatus for vehicle surroundings monitorings that assists in the checking of the periphery of a vehicle by its passenger by displaying images of the periphery of the vehicle captured by vehicle-mounted cameras.

2. Background Art

There is known a method for assisting parking operations after automatically recognizing a parkable parking space and detecting the condition of the periphery by, in parking a vehicle in a parking lot, recognizing white lines drawn on a road surface or spaces that are not occupied by other vehicles.

For example, there has been proposed a parking aid device comprising: a steering state detection means that detects the steering state of a vehicle; a parking space detection means that detects a parking space through image recognition based on an image from a camera; an predicted path of the vehicle computation means that computes an predicted path of the vehicle based on information from the steering state detection means; and notification means that provides to the driver information that aids parking based on information on the predicted path of the vehicle and the parking space (for example, see JP Patent Publication (Kokai) No. 11-339194 A (1999) (Patent Document 1)).

In addition, in recent years, there has been proposed a technique in which, with a view to finding the relative positions of a vehicle and a parking space with ease during parking operations, images from plural vehicle-mounted cameras are combined to create a bird-viewimage comparable to one that might be taken from right above the vehicle.

However, in creating a single bird-view image by compositing plural images captured by plural vehicle-mounted cameras, there is a problem in that brightness and contrast cannot be adjusted appropriately between each two cameras or within the images by each of the vehicle-mounted cameras, and the observed image of targets is not easy to recognize. For example, it is often the case that while a given vehicle-mounted camera may be capturing clear and easy to view images, another vehicle-mounted camera may be facing the sun, while yet another vehicle-mounted camera may be in the shade of a nearby vehicle. Further, since the direction of each vehicle-mounted camera is often uncontrollable and fixed, the state of the objects being shot by each camera changes from moment to moment with the ups and downs of the road, the direction of travel, changes in the weather, etc., and the images captured by each of the vehicle-mounted cameras, too, will vary randomly in their luminance and color balance from moment to moment.

As techniques for compositing images captured by plural cameras, JP Patent No. 3297040 B1 (Patent Document 2) and JP Patent Publication (Kokai) No. 2004-96488 A (Patent Document 3) are known, for example. Patent Document 2 discloses a technique in which tone correction is performed based on the brightness value average of overlapping areas among images captured by plural vehicle-mounted cameras. The object of the technique disclosed in Patent Document 2 is to generate an image with a wide dynamic range and good visibility by capturing images with varying exposure amounts while the vehicle is moving, and compositing the thus captured plural images after they have undergone bird-view conversion.

Further, there is disclosed in Patent Document 3 a technique in which images are composited by extracting from images captured by plural cameras partial images with appropriate exposure amounts. The object of the technique disclosed in Patent Document 3 is to generate a composite image that is easy to view by extracting, from plural images which are of the same area and taken using plural imaging devices with varying exposure amounts, images that each have an appropriate exposure amount.

SUMMARY OF THE INVENTION

However, when plural images are adjusted using the luminance values of overlapping portions based on the technique disclosed in Patent Document 2, the contrast of parts that the user may wish to see visually, such as parking space lines and people around the vehicle, may drop, or, in cases where halation occurs due to strong light, it may affect brightness at dark regions to cause a further drop therein. In particular, when providing a bird-view image for the purpose of monitoring the surroundings of the vehicle during parking operations, becoming unable to see people and the like in the periphery due to a drop in visibility poses a significant problem.

Further, with respect to the technique disclosed in Patent Document 3, in extracting appropriate partial images from overlapping images and compositing them, since there arises discontinuity at the compositing boundary portion(s), visibilitydrops.

The present invention is made in view of the problems discussed above, and an object thereof is to provide apparatus for vehicle surroundings monitorings that so assists that a passenger may check, with ease, the periphery of a vehicle based on images captured with vehicle-mounted cameras.

Apparatus for vehicle surroundings monitoring of the present invention that solves the problems above assists a passenger in checking the periphery of a vehicle by displaying an image capturing the periphery of the vehicle, the periphery check assisting device comprising: imaging units that capture a predetermined range of the periphery of the vehicle with mutually differing exposure amounts; an image recognition unit that performs recognition of a pre-set recognition target by image processing plural images that are captured by the image capturing units and that have mutually differing exposure amounts; an image compositing unit that generates a composite image from images based on a recognition result of the image recognition unit; and a display unit that displays the composite image composited by the image compositing unit.

According to the present invention, it is possible to improve, in outdoor environments with significant lighting fluctuation, the visibility of objects a driver should pay attention to during parking operations, such as parking frame lines, pedestrians in the periphery of the host vehicle, etc.

DESCRIPTION OF SYMBOLS

Figure 1:
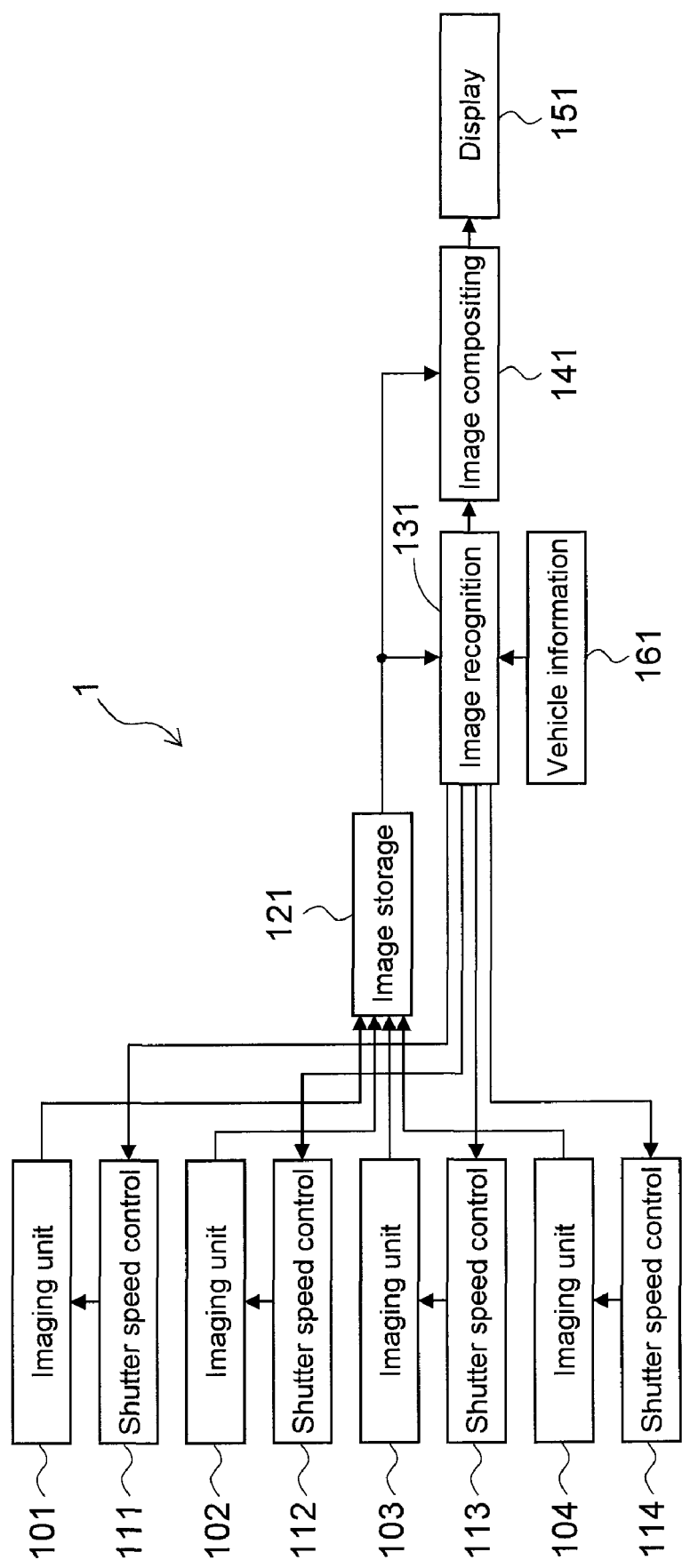
FIG. 1 is a system configuration diagram of apparatus for vehicle surroundings monitorings according to an embodiment of the present invention.

1 Periphery check assisting device
10 Vehicle
20 Parking frame
100-104 Imaging unit
110-114 Shutter speed control unit
121 Image storage unit
131 Image recognition unit
141 Image compositing unit
151 Display unit
161 Vehicle information providing unit

DETAILED DESCRIPTION OF THE PREFERRED EMBODIMENTS

First Embodiment

Apparatus for vehicle surroundings monitorings according to the first embodiment will now be described with reference to the drawings.

For example, a driver pays attention to various objects during parking operations, and the object paid attention change depending on the scene or task. A description will be provided in the present embodiment taking parking frames drawn on the ground as an example. It is noted that, besides parking frames, objects of interest include a variety of things such as pedestrians and other vehicles traveling in the periphery of the host vehicle, such three-dimensional structures as walls, pillars, linchpins, parked vehicles, etc., dangerous objects such as fallen objects, ditches, etc., and so forth.

Figure 8:
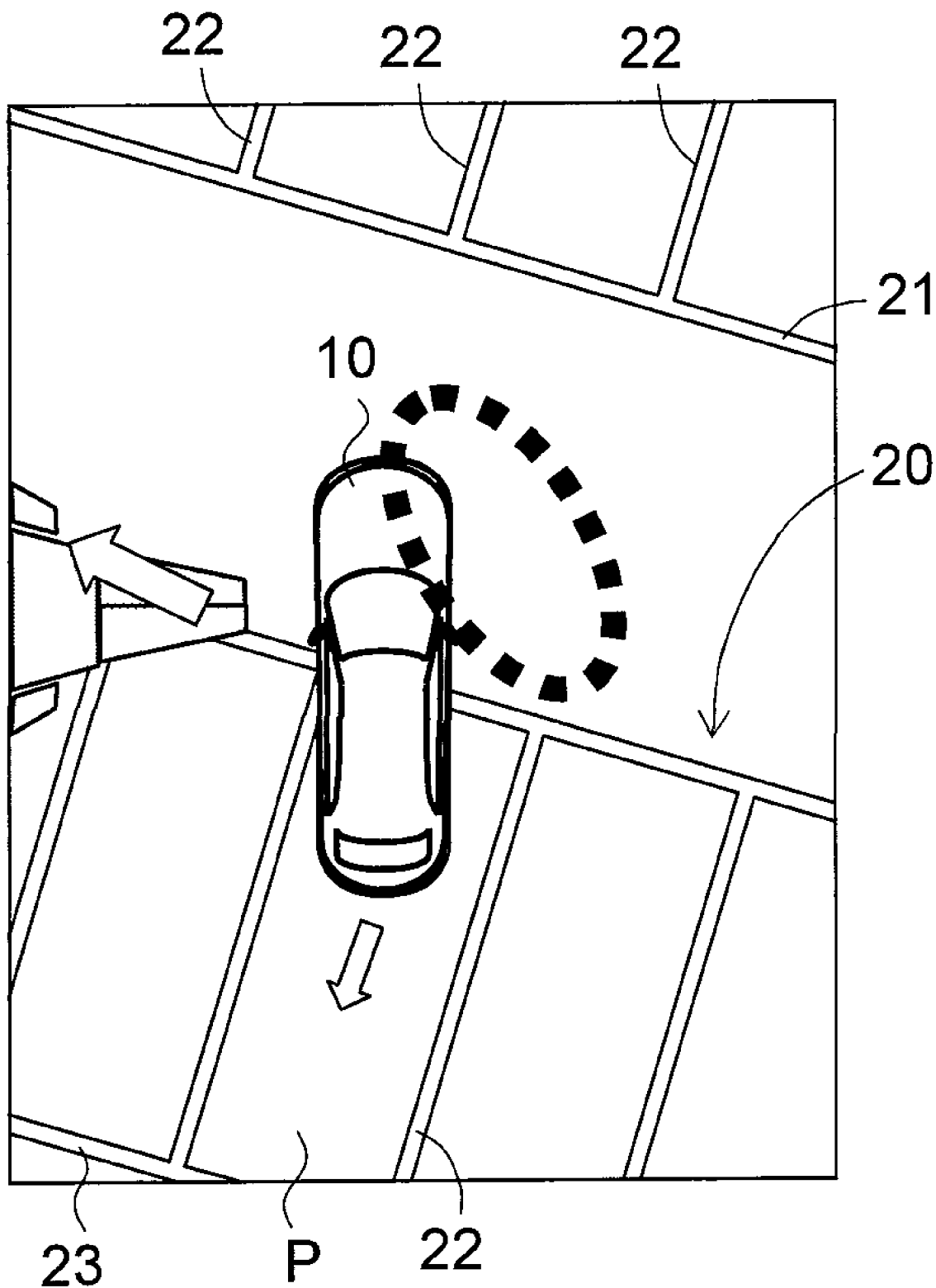
FIG. 8 is a diagram illustrating the content of a parking assisting method.
Figure 10:
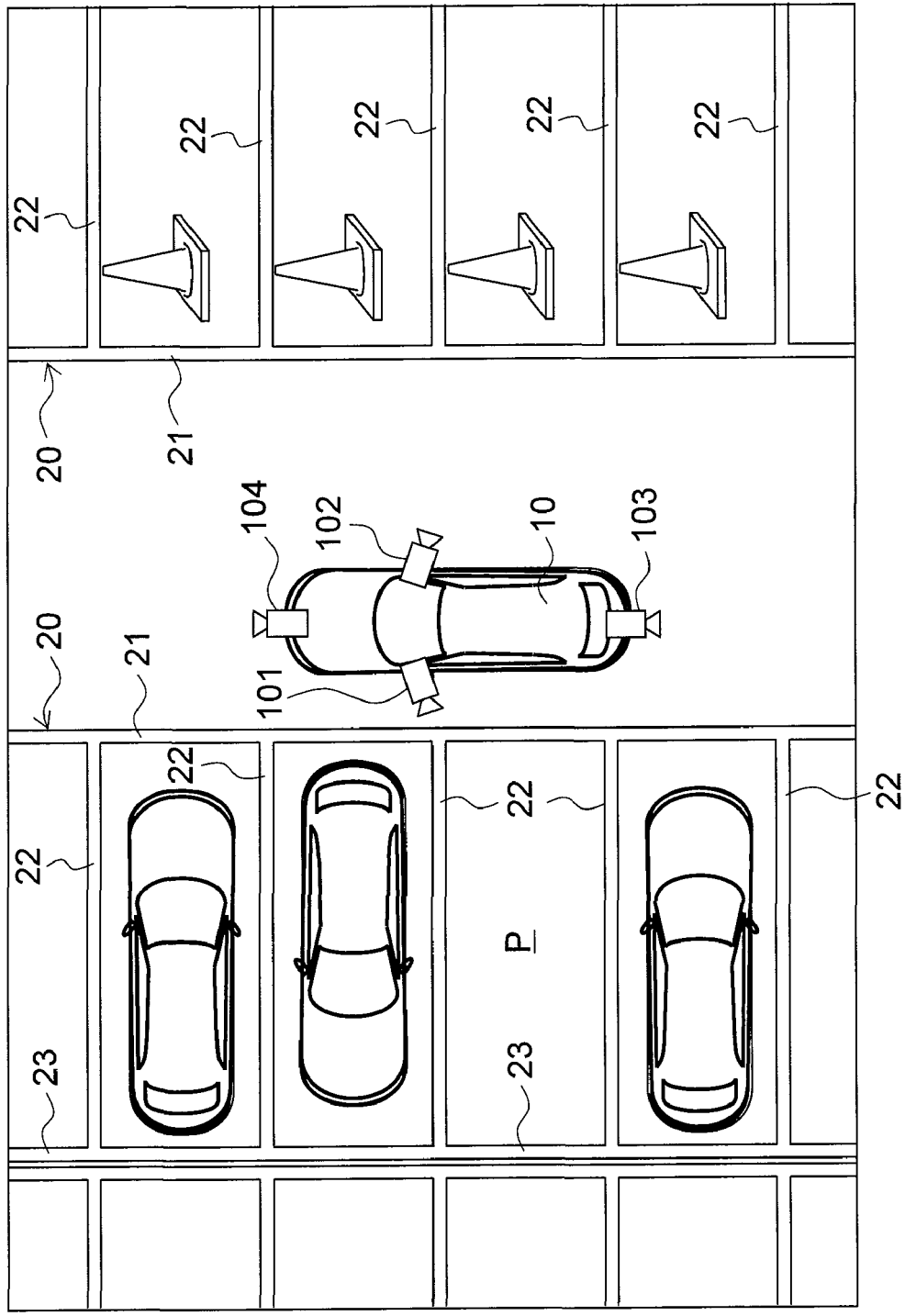
FIG. 10 is a diagram showing a host vehicle peripheral condition during parking assistance.

In order to drive the host vehicle into a parking space, which is the destination for parking, without fail and make fine adjustments in position and direction, the driver directs his/her attention to the parking frame that constitutes the perimeter of the parking space (see, for example, FIG. 8 and FIG. 10). Parking frames 20 generally comprise white lines and yellow lines as road surface markings drawn on such ground surfaces as asphalt and concrete road surfaces, etc., and are, as shown in FIG. 10 for example, formed by front lines 21, left/right-side lines 22, and rear lines 23.

Considering an environment where, under an environment of strong lighting, the parking frames 20 are drawn with bright yellow lines on a white concrete road surface and, further, there is a black oil smear nearby, an image taken under such an environment would generally be high in terms of the contrast, per se, of the overall image, but the road surface and the frame lines, which are prone to clipping, would drop in contrast, and exhibit poor visibility.

In this case, by reducing the aperture diameter of the camera and shortening the exposure time (reducing the exposure amount), it is possible to enhance the contrast between the road surface and the frame lines. However, the image would become darker in other parts. Thus, in trying to improve image quality using conventional techniques, there is a problem in that it is not always possible to improve the visibility of the object of interest.

With apparatus for vehicle surroundings monitorings in the present embodiment, a parking frame recognition process is performed with respect to each of the plural images so obtained as to mutually vary in exposure amount. Areas for which recognition is successful are deemed highly visible for humans as well at their respective exposure amounts, and are used preferentially during image compositing.

<Description of the Configuration of Apparatus for Vehicle Surroundings Monitorings (Basic Portion)>

FIG. 1 is a diagram illustrating the configuration of apparatus for vehicle surroundings monitorings in the present embodiment.

Apparatus for vehicle surroundings monitorings 1 comprises: plural imaging units 101-104; shutter speed control units 111-114 for controlling the exposure of these imaging units 101-104; an image storage unit 121 that stores images captured by the imaging units 101-104; an image recognition unit 131 that performs a recognition process for a target from the images stored in the image storage unit 121; an image compositing unit 141 that composites an image based on the images stored in the image storage unit 121 and an image recognition result obtained from the image recognition unit 131; and a display unit 151 that displays a composite image obtained from the image compositing unit 141.

The imaging units 101-104 capture images of a predetermined range in the periphery of the host vehicle, input those images to the image storage unit 121, and comprise, for example, cameras comprising a CCD and a lens. Each of the imaging units 101-104 captures images at mutually differing exposure amounts.

Figure 2:
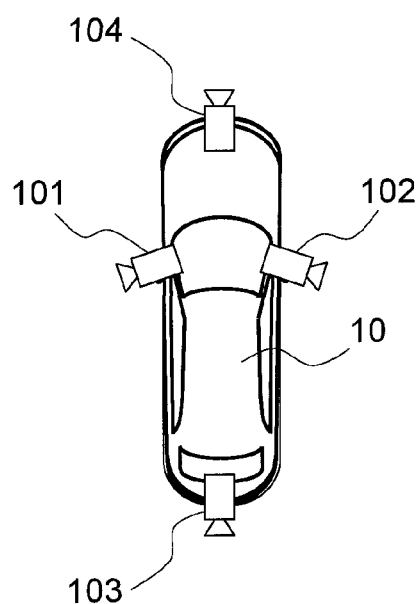
FIG. 2 is a diagram showing an arrangement example of imaging units mounted on a vehicle.

FIG. 2 is a diagram showing an arrangement example for the imaging units mounted on the vehicle. As shown in FIG. 2, the imaging unit 101 is disposed at a left portion of a vehicle 10 and serves as a left-side camera that captures leftward of the vehicle 10, and the imaging unit 102 is disposed at a right portion of the vehicle 10 and serves as a right-side camera that captures rightward of the vehicle 10.

Further, the imaging unit 103 is disposed at a rear portion of the vehicle 10 and serves as a rear camera that captures rearward of the vehicle 10. The imaging unit 104 is disposed at a front portion of the vehicle 10 and serves as a front camera that captures forward of the vehicle 10.

Figure 11:
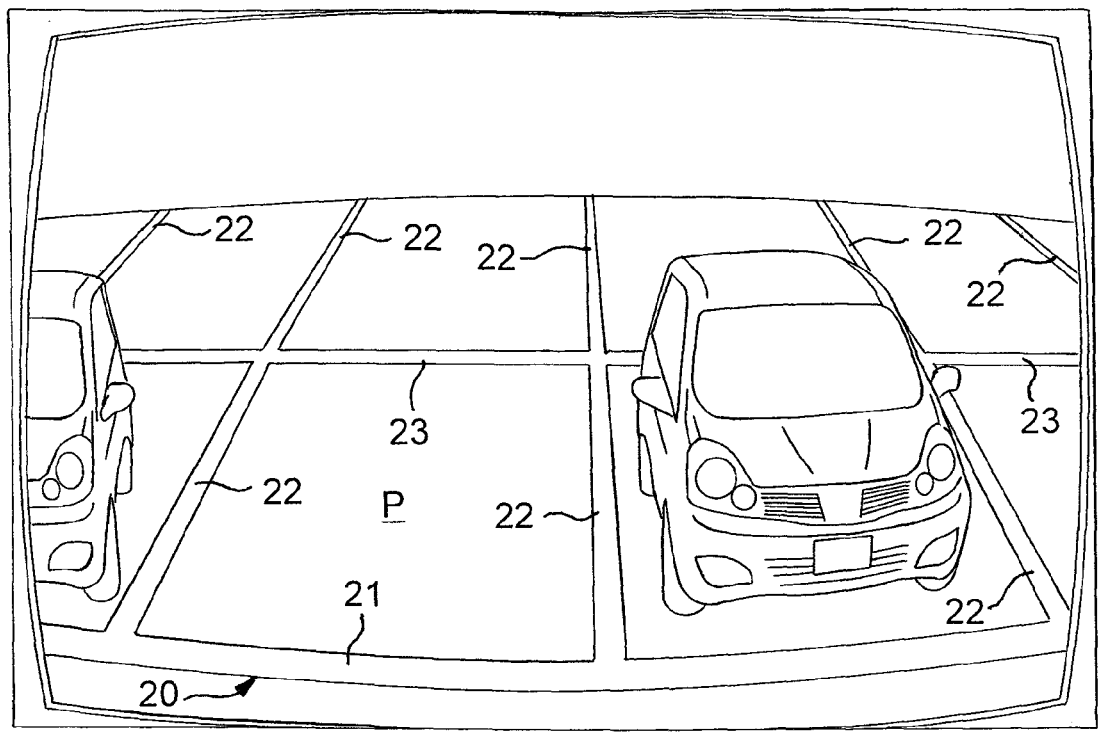
FIG. 11 is a diagram showing an example of an image obtained from a camera.
Figure 12:
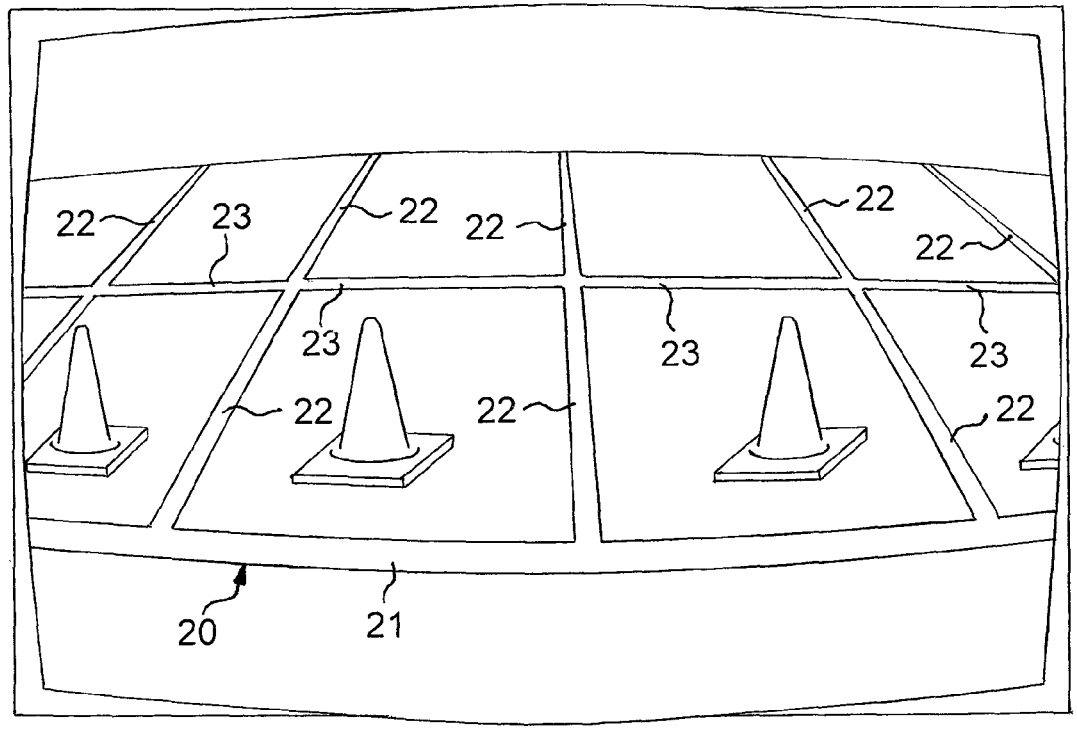
FIG. 12 is a diagram showing an example of an image obtained from a camera.

The imaging units 101-104 are so attached to the vehicle 10 that a range of approximately 5 meters around the host vehicle can be captured when parking the vehicle 10 in a parking space such as that shown in FIG. 10, for example. Thus, such images as those shown in FIG. 11 and FIG. 12 are obtained by the imaging units 101 and 102, for example. Further, for lighting, the vehicle 10 has lights for illuminating the periphery of the host vehicle built into the door mirror portions (none of which are shown). It is noted that the range of 5 meters mentioned above is merely an example, and the range may be changed in accordance with the size of the host vehicle, or the environment of operation. For example, if the present invention is to be used for purposes of improving the visibility of people in the periphery with respect to such construction machinery as large hydraulic shovels, etc., it would be better to capture a wider range.

The image storage unit 121 stores, as a set, each image obtained from the imaging units 101-104, the time at which the image was obtained, and its exposure time. In addition, the image storage unit 121 provides to the image recognition unit 131 the most recent images captured by the respective imaging units 101-104. Further, in response to a request from the image compositing unit 141, the image storage unit 121 provides any given stored image, including images that were stored in the past. As for the storage mode of the image storage unit 121, it may be configured with, for example, a memory, such as RAM, a communications interface, and a microcomputer for control, or it may also be configured as, instead of an independent module, a program on a computer.

At the image recognition unit 131, an image recognition process that recognizes the parking frames 20 is executed with respect to images of given times and given exposure amounts that are obtained from the imaging units 101-104. When the results of the parking frame recognition differ for images with differing exposure amounts obtained from, of the imaging units 101-104, the same imaging unit, it is computed, based on the accuracy of the parking frames 20 recognized through the image recognition process, the image area of which exposure amount is suitable for recognition, that is, has better visibility. It is noted that the term "accuracy" refers to the accuracy of recognition of the recognition target by the image recognition unit 131.

The image compositing unit 141 composites plural images with mutually differing exposure amounts based on the levels of visibility (accuracy) of the image areas computed at the image recognition unit 131. First, with respect to the plural images with mutually differing exposure amounts respectively obtained at the imaging units 101-104, the images are composited for each of the imaging units 101-104, and one composite image is generated for each of the imaging units 101-104. Subsequently, by joining and compositing the four composite images with good visibility each created for the respective imaging units 101-104, a host vehicle periphery composite image (see FIG. 20, for example) with good visibility is generated.

Figure 13:
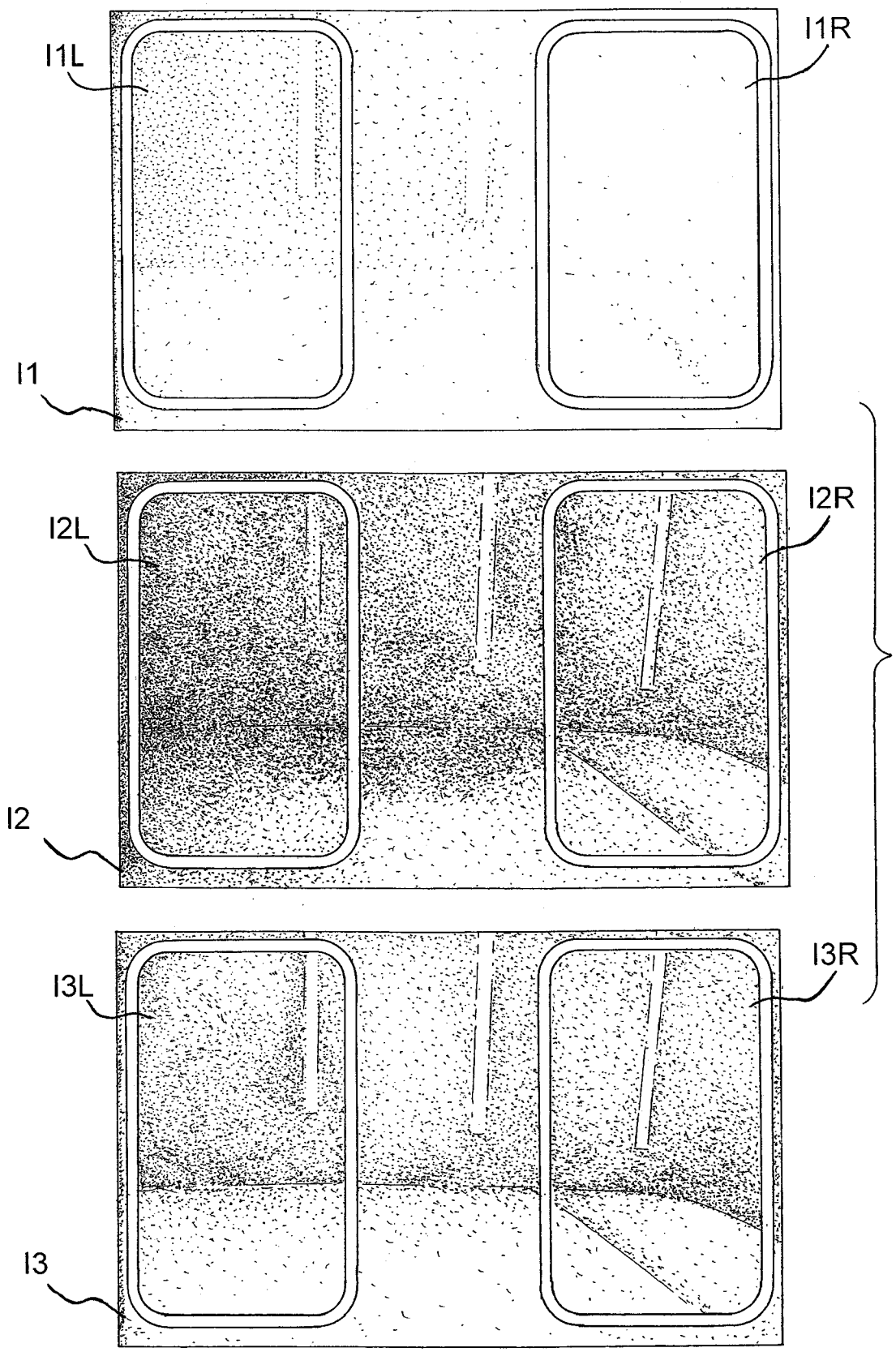
FIG. 13 is a diagram showing that how parking frames appear differs depending on exposure amount.

It is noted that it is not necessarily the case that good visibility is attained when all areas of one image obtained from a given imaging unit are of a single exposure amount. FIG. 13 is a diagram showing examples of images captured on the left side of the vehicle, and there are shown an image I1 captured at an exposure amount E1, an image I2 captured at an exposure amount E2, and an image I3 captured at an exposure amount E3.

For example, the image I1 captured at the exposure amount E1 has good visibility in the left-side area of the image, but has poor visibility in the right-side area of the image. Further, the image I2 captured at the exposure amount E2 has good visibility in the right-side area of the image, but has poor visibility in the left-side area of the image.

In such a case, the image I3, which is a composite image wherein the left-side area of the image I1 and the right-side area of the image I2 have been composited, is generated by the image compositing unit 141. Thus, it is possible to improve the visibility of the parking frames 20, which are recognition targets within the composite image I3.

Then, the image compositing unit 141 joins and composites the composite images respectively created for the imaging units 101-104, and generates the host vehicle periphery composite image, which is a bird-view image comparable to one that might be captured from right above the vehicle 10.

The display unit 151 is a device for presenting to the driver, who is the user in this case, the host vehicle periphery composite image generated at the image compositing unit 141. It is a device that is capable of presenting visual information to a user, such as a driver, etc., examples of which may include a monitor of a car navigation system, a monitor built into the rear-view mirror, a projector device that is adapted to project onto the windshield, etc. With the present configuration, there is such an effect that the visibility of each of the imaging units 101-104 may be optimized so as to be improved by, with respect to the area of each of the imaging units 101-104, first compositing images of plural exposure amounts, and then joining and compositing the composite images of the respective imaging units 101-104.

In addition to the configuration discussed above, there may be, as extension units, a vehicle information providing unit 161, and an exposure amount information holding unit. The vehicle information providing unit 161 and the exposure amount information holding unit above are used to improve the processes by the image recognition unit 131 and the image compositing unit 141.

At the vehicle information providing unit 161, the relative host vehicle position in each of the captured images is computed from information of sensors mounted on the vehicle 10, such as a vehicle speed sensor, wheel speed sensor, steering angle sensor, wheel angle sensor, host vehicle position measuring system, etc., and is added to the information as of when images are stored in the image storage unit 121.

In capturing plural images of varying exposure amounts with the same imaging unit, since the images would be captured at different times, if the host vehicle or objects in the periphery is/are moving, objects to be captured would move within the images, and it would not be possible to perform image compositing correctly.

Thus, it is possible to calculate the apparent movement amounts among the respective images based on the relative host vehicle positions, and, at the image compositing unit 141, it is possible to align the plural images. In addition, in cases where it is possible to obtain information on stop lamp activation by the parking brake, since it would be obvious that the host vehicle is stationary, thereby indicating that there is no need to align the plural images, stop lamp activation information may also be added to the information as of when the images are stored in the image storage unit 121 and be used in the compositing process at the image compositing unit 141.

Further, in cases where it is possible to obtain headlamp activation information and/or wiper activation information, since it can be inferred that the external lighting conditions would most likely be dark and the captured images unclear, thereby indicating that clear feature points will not readily manifest themselves during the compositing of the plural images, by adding them, too, to the information as of when the images are stored in the image storage unit 121, they may be used in the compositing process at the image compositing unit 141.

The exposure amount information holding unit stores information regarding exposure amount for each of the images captured by the imaging units 101-104. By determining, based on the chronologically stored exposure amounts of each of the imaging units 101-104 and on the success/failure of recognition at the image recognition unit 131, how to subsequently alter exposure amount, the image recognition unit 131 is able to determine the optimal combination of exposure amounts, control shutter speed through the shutter speed control units 111-114, and specify the exposure amount for each of the imaging units 101-104. The exposure amount information holding unit may also be provided within the image storage unit 121.

<Process Flow (Basic Portion)>

Next, with respect to the present embodiment, a process flow corresponding to the device configuration discussed above will be described.

First, the imaging units 101-104 capture images of the periphery of the vehicle at varying times and plural varying exposures as specified by the shutter speed control units 111-114. The obtained images and the parameters at the time of capture are stored in the image storage unit 121.

In the parameters at the time of capture are included shutter speed, time of capture, and vehicle information at the time of capture. The term "vehicle information" refers to information that is exchanged among plural devices of the vehicle 10 through a network internal to the vehicle, such as vehicle speed, wheel speed, steering angle, wheel angle, host vehicle position by a host vehicle positioning system, headlamp activation information, wiper activation information, and the like, and also includes information that is exchanged with the host vehicle through vehicle-vehicle communications and road-vehicle communications.

Next, the images stored in the image storage unit 121 are sent to the image recognition unit 131, and a parking frame recognition process is executed. This process of parking frame recognition comprises two stages, namely, the recognition of line segments that form the parking frames 20, and a determination as to whether or not a combination of the line segments are appropriate as the parking frames 20. For example, with respect to the recognition of line segments, by applying Sobel filters of the vertical direction and the horizontal direction relative to the image, extracting edge points within the image through binarization at an appropriate threshold, and applying the Hough transform to a group of coordinates of the extracted edge points, it is possible to extract a group of edge points aligned linearly.

In addition, with respect to the determination as to whether or not they are appropriate as the parking frames 20, in the case of recognizing parking frames 20 for a passenger vehicle for example, when it is detected that two substantially parallel parking frame lines 22, 22 are drawn on a road surface at an interval of 2 m to 4 m, which corresponds to the width of a vehicle (parking frame for perpendicular parking), or at an interval of 4 m to 6 m, which corresponds to the length of a vehicle (parking frame for parallel parking), the area therebetween may be determined as being parking frames 20 in which the vehicle 10 may be parked.

This parking frame recognition is performed with respect to images of plural varying exposure amounts. However, for images whose shutter speed control is inappropriate in relation to the peripheral environment of the host vehicle, the edge points within the images mentioned above are not extracted.

For example, when, under a brightly lit environment, shutter speed is slow and extended exposure is performed, the image would be clipped, and there would be no difference in luminance value between adjacent pixels. As a result, edge points will not be extracted in the image after the application of the Sobel filter, and the parking frames 20 will not be recognized.

If there is an image area that cannot be recognized within an image of given exposure, this signifies either that there are no parking frames 20 in this area or that the picture quality did not allow for recognition due to inappropriate exposure adjustment.

In addition, at the image recognition unit 131, the accuracy of parking frame recognition is computed based on how clearly edge points were detected, how accurate linearity was when the Hough transform was performed, etc.

While specific computation examples will be discussed later, indicators are so set as to indicate that the parking frame recognition was clearly successful the higher this accuracy is. As discussed above, it can be inferred that areas in which targets can be recognized clearly through image recognition would have high visibility for people as well. Thus, the position at which the parking frames 20 detected within an image of given exposure are present and the accuracy of the detected parking frames 20 are obtained from the image recognition unit 131 as outputs.

In addition, at the image recognition unit 131, signals are sent to the shutter speed control unit 111-114 so as to capture at one different exposure from among plural pre-set levels of shutter speed. It is noted that if the vehicle information providing unit 161 is present, a head lamp activation signal and/or the wiper activation status is/are checked, and signals are sent to the shutter speed control units 111-114 so that when the peripheral environment is dark, shutter speed is made slower to obtain brighter images.

Further, when the vehicle speed information from the vehicle information providing unit 161 indicates high speed, since the images may become blurred, signals are sent to the shutter speed control units 111-114 to further increase shutter speed so that sharp images without any blurriness may be obtained.

At the image compositing unit 141, images with differing exposure amounts are composited based on image areas in which the parking frames 20 recognized at the image recognition unit 131 are present, and the accuracy of recognition, i.e., the level of visibility, thereof. In this compositing, first, there is created a weight map which represents how each area of each image is to be used with how much weight among images that have been aligned taking into consideration the movement amounts among images.

Next, in accordance with this weight map, the luminance values and color information (hue, saturation) of the respective pixels of plural images are mixed to create a composite image. In so doing, since color information is often missing in images of poor visibility, it is also possible to have only the luminance value information be subject to mixing, and use the values of color information from images with high saturation.

Figure 18:
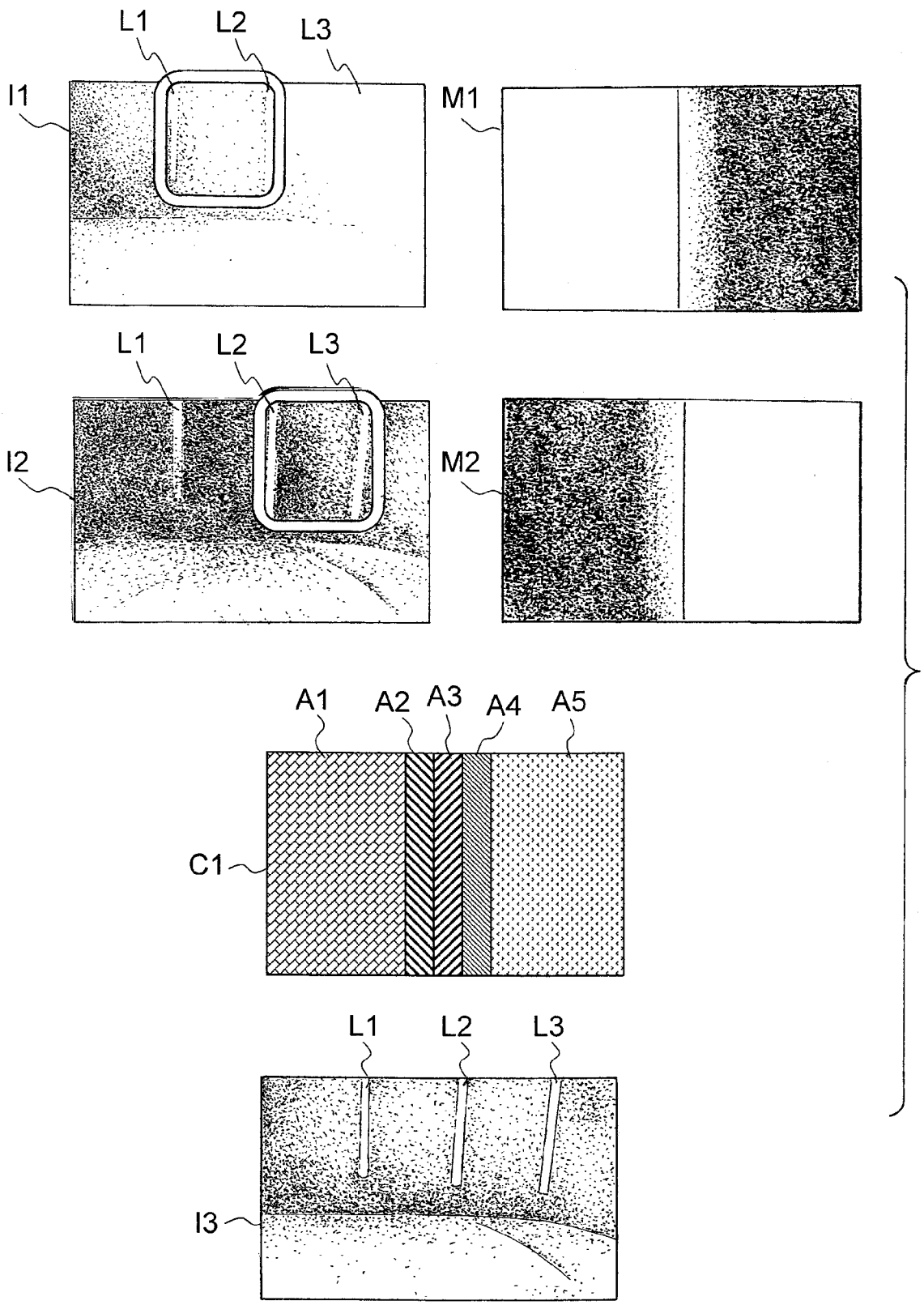
FIG. 18 is a diagram showing a method for generating a weight map in the first embodiment.

FIG. 18 is a diagram showing examples of weight maps. Weight maps M1 and M2 indicate how recognizable an image each region in each of the images I1 and I2 is, and are grayscale images where the white parts in the diagram represent higher visibility as compared to images of different exposure, and where the black parts represent lower visibility. By taking the sum of products of the weight maps M1 and M2 and the images I1 and I2, the output image I3 is obtained.

For example, there are considered the image I1 shot in a state of small exposure amount and the image I2 shot in a state of large exposure amount, both captured by the same imaging unit at times close to each other. Three parking frame lines appear in both the image I1 and the image I2. However, only parking frame lines L1 and L2 on the left side of the image are detected in the image I1, and only parking frame lines L2 and L3 on the right side of the image are detected in the image I2.

In accordance with the areas of these detected parking frame lines, and in accordance with the accuracy of detection and the distance from the detected areas, an image compositing map C1 is generated. The method of computing detection accuracy will be described later. The image compositing map C1 defines in a continuously varying manner how each image is to be used in what proportion in performing image compositing, wherein: area A1 is an area where 100% of the image I1 is to be used; area A2 is an area where 51-99% of the image I1 is to be used with the remainder being the image I2; area A3 is an area where 50% each of the image I1 and the image I2 are to be used; area A4 is an area where 51-99% of the image I2 is to be used with the remainder being the image I1; and area A5 is an area where 100% of the image I2 is to be used. By weighting and adding the input images I1 and I2 in accordance with this image compositing map C1 to composite them, the output image I3 is generated.

Figure 9:
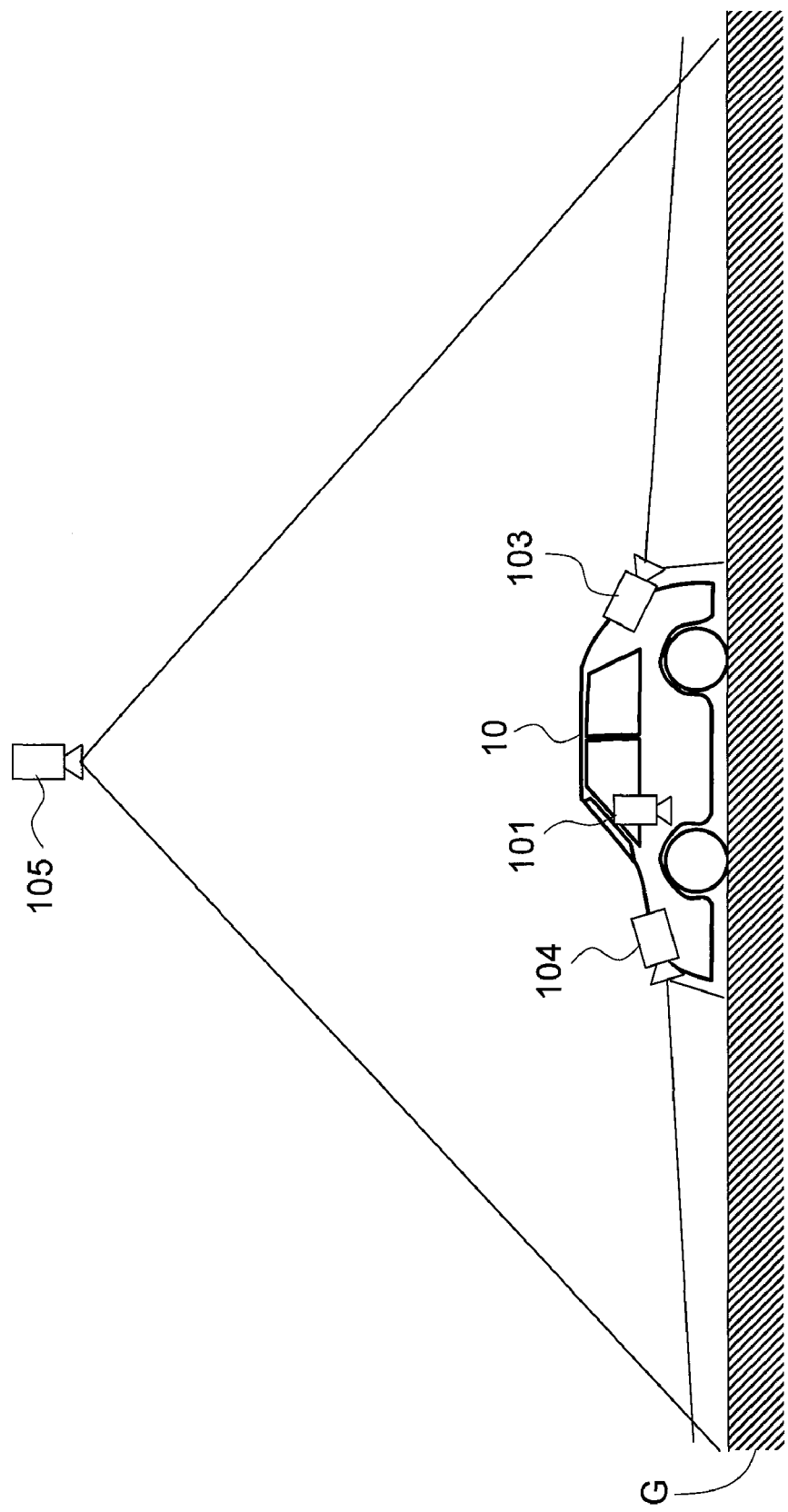
FIG. 9 is a diagram showing bird-view conversion.

With respect to four composite images obtained from the respective imaging units, bird-view conversion is performed by performing distortion correction, and joining and compositing them taking into consideration the relationship among the imaging units 101-104. Thus, a host vehicle periphery composite image with high visibility is generated. The term "bird-view conversion" refers to a kind of image conversion method wherein, as shown in FIG. 9, based on the images obtained by the imaging units 101-104 and assuming all points within the images lie on a road surface G, conversion is performed as if one were viewing downward from a virtual camera viewpoint 105. Since this method of generating a host vehicle periphery composite image is a known technique, a description thereof will not be provided in particular herein.

At the shutter speed control units 111-114, signals for capturing images by controlling the imaging units 101-104 to adjust their shutter speeds in accordance with signals from the image recognition unit 131 are sent. At the image compositing unit 141, from mask images at the respective exposures obtained from the image recognition unit 131 and from camera images at corresponding exposures obtained from the image storage unit 121, an image is composited in accordance with the weights of the mask images and sent to the display unit 151.

Figure 6:
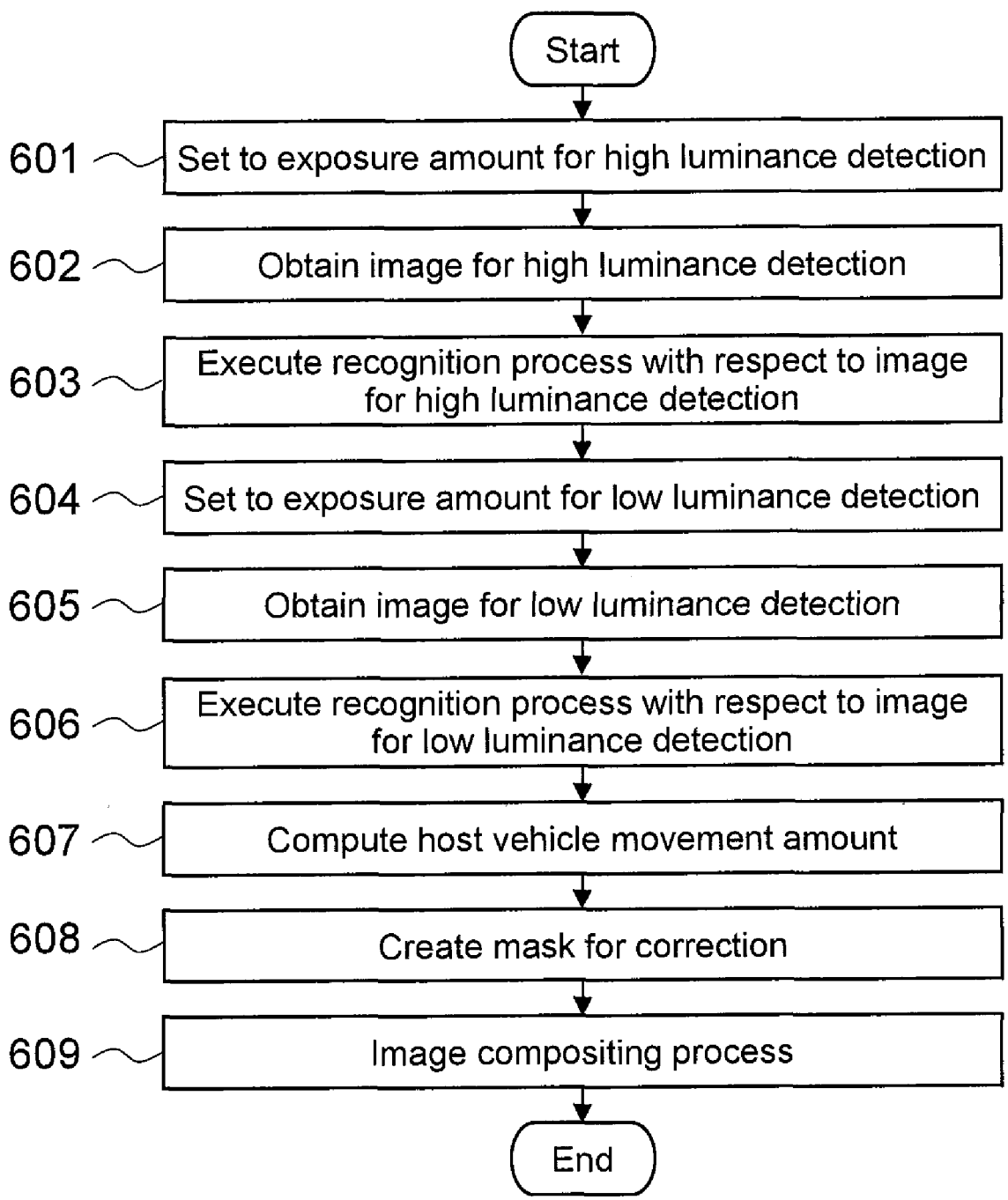
FIG. 6 is a diagram showing the flow of the overall process.

It is noted that in the process of compositing, if the host vehicle is in motion, position mismatches would occur, causing the composite image to be blurred or appear doubled. Therefore, compositing is performed after correcting for the movement amount of the host vehicle with respect to the bird-view image. The host vehicle movement amount may be found by, instead of from a wheel speed sensor, a vehicle speed sensor, a positioning sensor, etc., computing optical flow from images. The display unit 151 may be, for example, a liquid crystal monitor, a display unit that projects onto the windshield, or the like, and displays an image obtained from the image compositing unit 141. FIG. 6 is a flowchart showing the flow of the process described above.

<Details of a Method for Computing the Accuracy of Parking Frames>

The accuracy of parking frames may be defined as the sum of accuracy Rimg of image information and accuracy Rstr of structural information of a recognition target.

Accuracy Rimg of image information may be defined by way of the contrast and sharpness of an image area near a parking frame line. An image area near a parking frame line may be defined as, for example in the case of a parking frame line and assuming that the parking frame line has a width of W and a length of L, an area of 3W in width and L in length about a central axis of the parking frame line such that the area includes on both sides an area of the road surface having a width that is comparable to that of the frame line.

The contrast of an image area may be defined as the ratio of maximum luminance value Ymax included in that area to minimum luminance value Ymin, that is, Ymax/Ymin. It is an indicator that indicates how much of a contrast the parking frame line, which is the target of interest, and the road surface can be recognized with, and assumes a lesser value when the visibility of the image is poor. Sharpness is, considering a straight line that is perpendicular to the boundary between the frame line area and the road surface, the inverse of the distance between extreme values when quadratic differentials of luminous values are taken along this straight line. In the case of an image with poor visibility where the boundary is blurred, this numerical value will be small.

Further, accuracy Rstr of structural information of a recognition target may be defined as an evaluation indicator for the apparent shape obtained from an image, such as distortions with respect to the linearity, parallelism, and perpendicularity of frame lines. Distortion with respect to the linearity of frame lines may be defined as the sum of squares of the distance from an approximate straight line, which is computed through a Hough transform or the like with respect to the coordinates of the above-mentioned group of edge points, up to each of the edge points.

Distortion with respect to the parallelism of frame lines may be defined as, for example in a case where a parking frame comprises two line segments, cos θ, assuming that the angle formed between each line segment and the approximate straight line is θ (where $0 \leq \theta \leq 90$ [deg]). In addition, distortion with respect to the perpendicularity of frame lines may be defined as, for example in a case where a parking frame comprises two line segments, assuming a line connecting the end points on the parking frame entrance side of the respective frame lines, cos θ, assuming that the angle formed between this line and the approximate straight line of each frame line is θ (where $0 \leq \theta 90$ [deg]). It is noted that in a case where a parking frame comprises four line segments, they may similarly be defined as cosines of the angles formed between the approximate straight lines of the respective frame lines. All of these values decrease when distortion is greater.

Thus, accuracy Rimg of image quality information and accuracy Rstr of structural information of a recognition target assume smaller values when distortion is large and visibility poor, and conversely assume greater values when distortion is small and visibility good.

<Details of Compositing Method>

Figure 14:
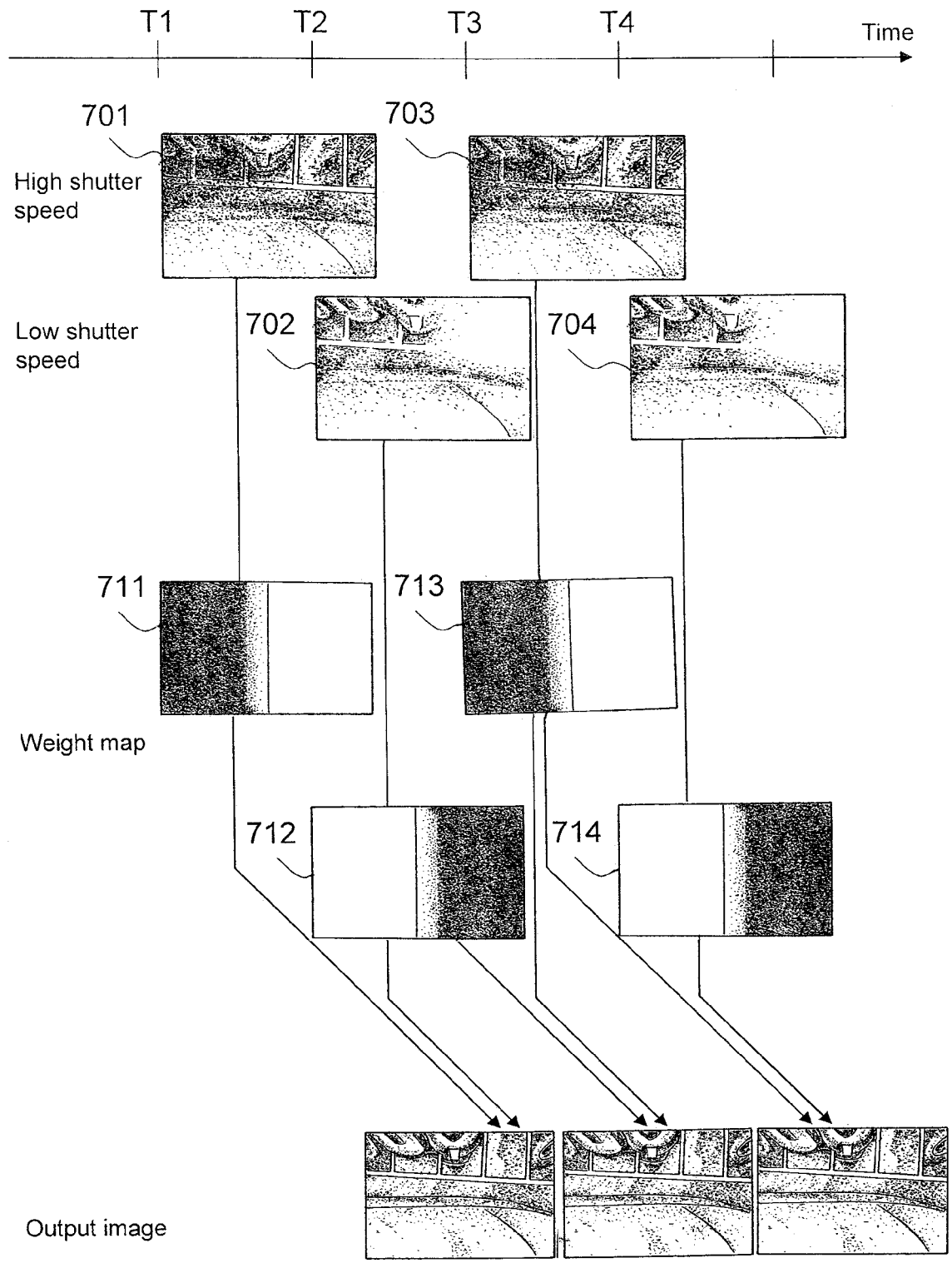
FIG. 14 is a diagram showing images with varying exposure amounts and weight maps thereof.

Details of an image compositing method will now be described using FIG. 14. A case is considered where parking frame recognition is performed with respect to four images 701-704 taken at different times with the same imaging unit. However, the image 701 is an image captured at time T1 with a given exposure amount E1, and the image 702 is an image captured at time T2, which is different from the time at which the image 701 is captured, with an exposure amount E2. Further, the image 703 is an image captured at time T3 with exposure amount E3, which are different from those of the images 701 and 702, and the image 704 is an image captured at time T4 with exposure amount E4, which are different from those of the images 701-703.

Figure 15:
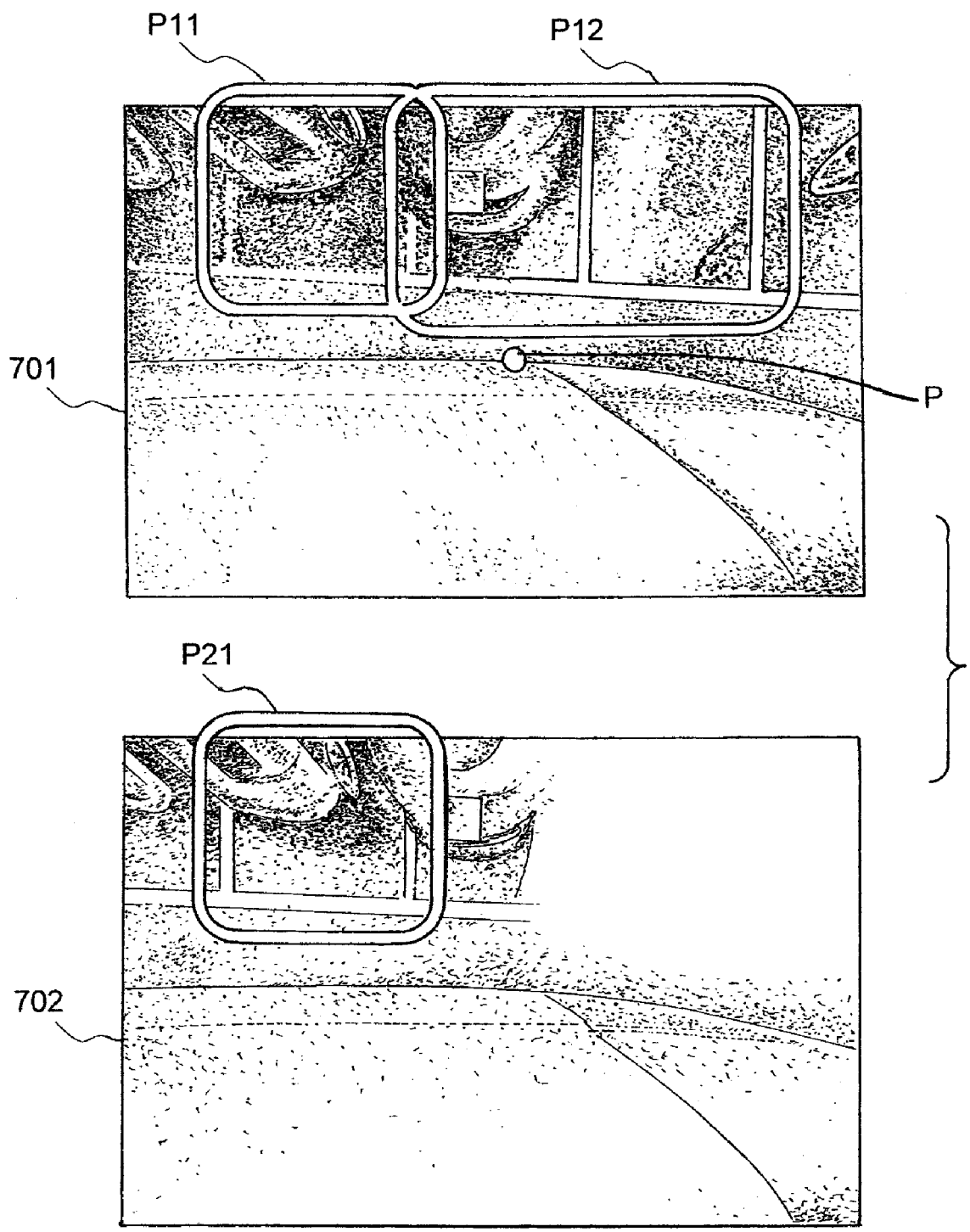
FIG. 15 is a diagram showing recognition results for parking frames.

At the image recognition unit 131, a parking frame line recognition process is performed with respect to each of the images 701-704, and the area of the recognition result thereof and the accuracy of the parking frame are sent to the image compositing unit 141. For example, in FIG. 15, two parking frames P11 and P12 are recognized in the image 701, one parking frame P21 is recognized in the image 702, and the accuracies of parking frame recognition associated therewith are respectively denoted R11, R12 and R21 (where R11<R21).

When the host vehicle is stationary, since P11 and P21 would be at substantially the same position within the respective images, it would be obvious that they are the same parking frame. However, since the accuracy R21 of the parking frame P21 is high, it can be seen that the visibility of the image 702 is high for this image area.

Assuming that 711 and 712 respectively denote weight maps for the images 701 and 702 in this case, the weight of the area corresponding to the parking frame P11 within 711 may be defined as being R11/(R11+R21), and the weight of the area corresponding to the parking frame P21 within 712 as being R21/(R11+R21). In other words, although both exposure amount E1 and exposure amount E2 are appropriate for this area, the image with better visibility turned out to be the image 702.

On the other hand, from the fact that a parking frame corresponding to the parking frame P12 in the image 701 is not recognized in the image 702, it can be understood that, for this area, only exposure amount E1 is appropriate and that exposure amount E2 is inappropriate. For this reason, the weight of the area corresponding to the parking frame P12 within the weight map 711 is set to 1, and the weight of the area corresponding to the parking frame P12 within the weight map 712 is set to 0.

The weight of an area in which parking frames could not be recognized in any of the images 701 and 702 can be determined by letting weights be propagated in accordance with the distances from areas for which weights have been determined. In other words, in FIG. 15, with respect to point P within the image 701, since the distance from the area of the parking frame P11 is L1 and the distance from the area of the parking frame P12 is L2, the weight of point P may be defined as follows, varying the weight in accordance with the ratio of distances from weights that have been determined:

$$\{R11/(R11+R21)\}\times\{L2/(L1+L2)\}+\{R21/(R11+R21)\}\times\{L1/(L1+L2)\}$$

This propagation of weights may be made proportional to the square of distance, or be converted by some appropriate monotonic function, such as a sigmoid function or the like.

In addition, the image recognition unit 131 may also comprise a function of composite image brightness stabilization with respect to timeline.

Without such a function, parking frame recognition becomes unstable, and should detection and non-detection be alternated between per frame, changing the weight maps each time could cause the brightness of the output image to change incessantly, making it difficult to view. In order to address such a problem, for purposes of stabilizing the brightness of composite images, weight maps may be retained per exposure amount so that weightings would not change abruptly.

Specifically, in a case where W(t−1,E1) and W(t−1,E2) are the respective weight maps for exposure amounts E1 and E2 at time t−1 and where W(t,E1) and W(t,E2) are the respective weight maps for exposure amounts E1 and E2 at time t that are computed in the manner mentioned above, by having the weight maps at time t for use in image compositing be:

$$W'(t,E1)=\alpha\times W(t,E1)+(1-\alpha)\times W(t-1,E1); \text{ and}$$

$$W'(t,E2)=\alpha\times W(t,E2)+(1-\alpha)\times W(t-1,E2),$$

it is possible to prevent abrupt changes in the weight maps. Here, $\alpha$ represents the degree to which the weight computed from a new image is to be reflected, and is some appropriate coefficient that is experimentally determined. Alternatively, W' may also be stabilized using a Kalman filter.

It is noted that if the host vehicle is in motion, by computing the apparent host vehicle movement from the images and aligning the images through an affine transformation such as rotation, translation, etc., it is possible to consider the host vehicle as if it were stationary. This apparent movement amount may be computed by computing the motion of the images through, for example, feature point tracking by an optical flow method or SIFT (Scale-Invariant Feature Transform).

Then, by subsequently joining and compositing the four images with high visibility that are created for the respective imaging units, a host vehicle periphery image with high visibility is generated.

Figure 3:
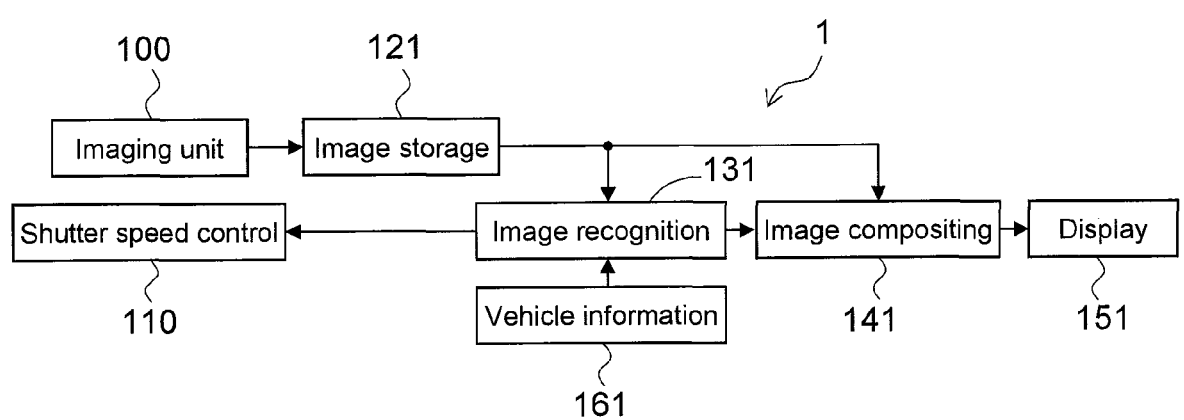
FIG. 3 is a diagram showing a configuration comprising a single imaging unit.

It is noted that although, with respect to the present embodiment, there has been described an example where the periphery check assisting device 1 comprises the plural imaging units 101-104, there would be no problem even if the number of cameras were to change. Specifically, it can readily be inferred that images with high visibility can be provided through the means discussed above even with, for example, a two-camera configuration, with cameras on the left and at the rear, or a one-camera configuration, with a camera only at the rear. FIG. 3 is a diagram showing a configuration in the case of one camera.

<Process of the Vehicle Information Providing Unit>

The role of the vehicle information providing unit 161 is to provide information for performing more appropriate image compositing by obtaining from sensor information the movement amount and peripheral environment of the host vehicle.

In order to calculate the movement amount of the host vehicle, such information as vehicle speed, wheel speed, steering angle, wheel angle, etc., are obtained from sensors mounted on the vehicle 10. Since the method of computing the host vehicle movement amount from such sensor information is similar to common dead reckoning methods or autonomous navigation, a description thereof will herein be omitted.

In addition, in cases where it is possible to obtain absolute host vehicle positions relative to the Earth by means of a host vehicle positioning system, by taking the difference between such chronological information, it is possible to calculate the movement amount of the host vehicle. By storing this movement amount of the host vehicle in the image storage unit 121, there may be expected an effect whereby the alignment accuracy for images is improved.

In order to recognize the peripheral environment, in cases where it is possible to obtain information on stop lamp activation by a parking brake, by setting the host vehicle movement amount to 0 and storing it in the image storage unit 121 to reveal that there is no change in position between images, there may be expected an effect whereby the reliability of the identification process for a recognition target is increased.

Further, in cases where it is possible to obtain headlamp activation information and wiper activation information, the fact that the external lighting conditions are in a dark state due to such factors as it being night, raining, etc., is stored in the image storage unit 121. Since there is a strong possibility that the captured images would be blurred and that clear feature points may not be exhibited during the compositing of plural images, by changing such parameters as the binarization threshold, etc., of the image recognition unit 131 so that edges can be extracted from blurred images, there may be expected an effect whereby recognition performance is improved. In addition, since a local area on the road surface forward of the host vehicle would be lit by the headlamps, causing erroneous recognition of parking frame lines, by having the image recognition unit 131 perform a process for ignoring the edges of this area, there may again be expected an effect whereby recognition performance is improved.

<Process of the Exposure Amount Information Holding Unit>

The role of the exposure amount information holding unit is to store exposure amounts for past images captured by each of the imaging units 101-104, plan what level of exposure amount each of the imaging units should subsequently capture images with, and specify exposure amounts to the shutter speed control units 111-114.

By storing information on what sort of recognition results were obtained for various images captured with various exposure amounts, it is possible to determine which of the current plural shutter controls is appropriate. For example, there is considered a camera that alternates between two kinds of shutter speed, namely, a given shutter speed S1 and a longer shutter speed S2.

Figure 16:
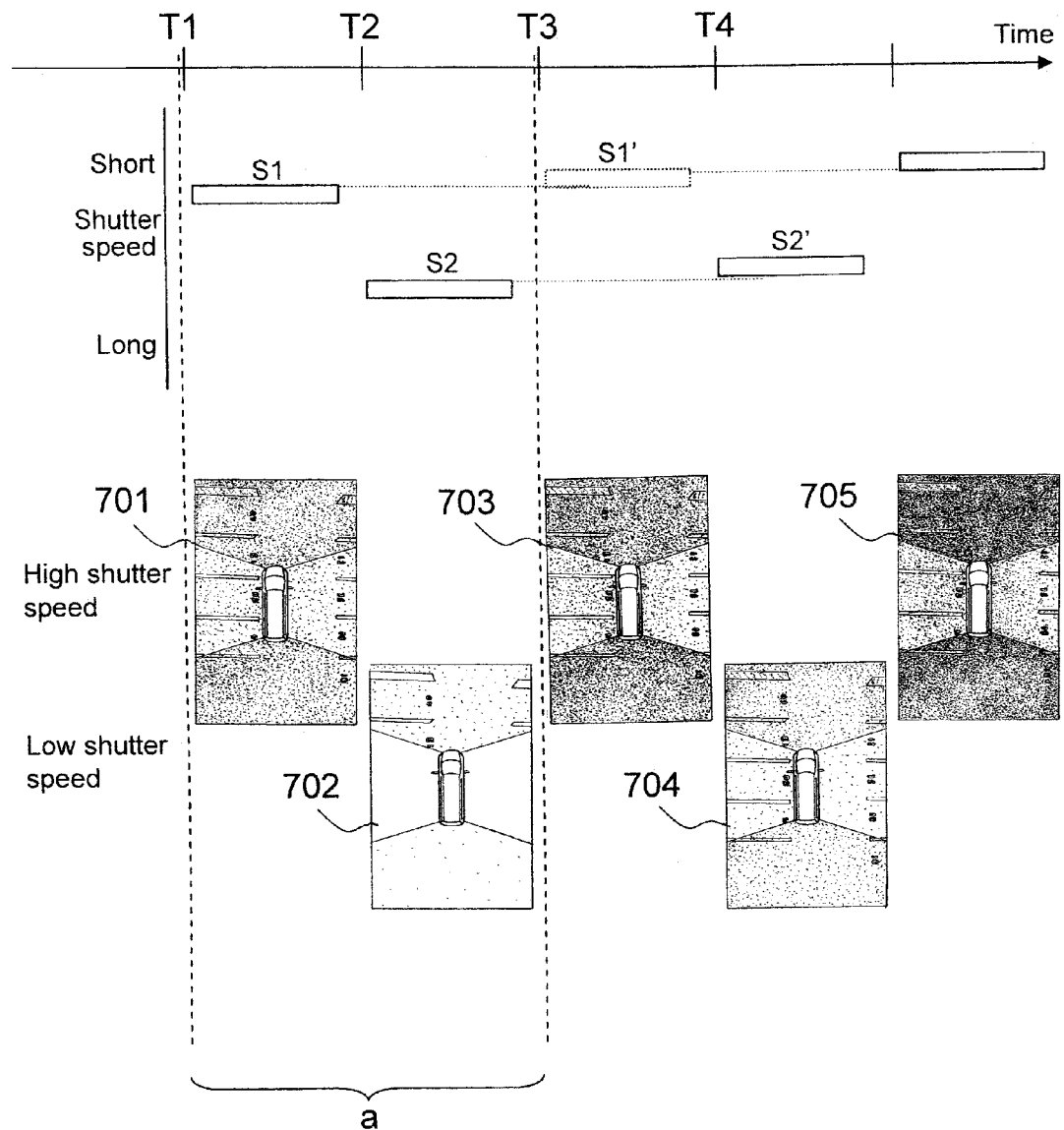
FIG. 16 is a diagram showing a scheme for changing shutter speed.

If, as in interval a in FIG. 16, some sort of recognition result is obtained for both shutter speeds S1 and S2, but a more appropriate recognition result is obtained for S1, this would signify that more appropriate recognition is possible when the shutter time is shorter. Thus, using some appropriate change coefficient ΔS, adjustments are made to shorten both shutter times, where S1'=S1−ΔS, and S2'=S2−ΔS.

Figure 17:
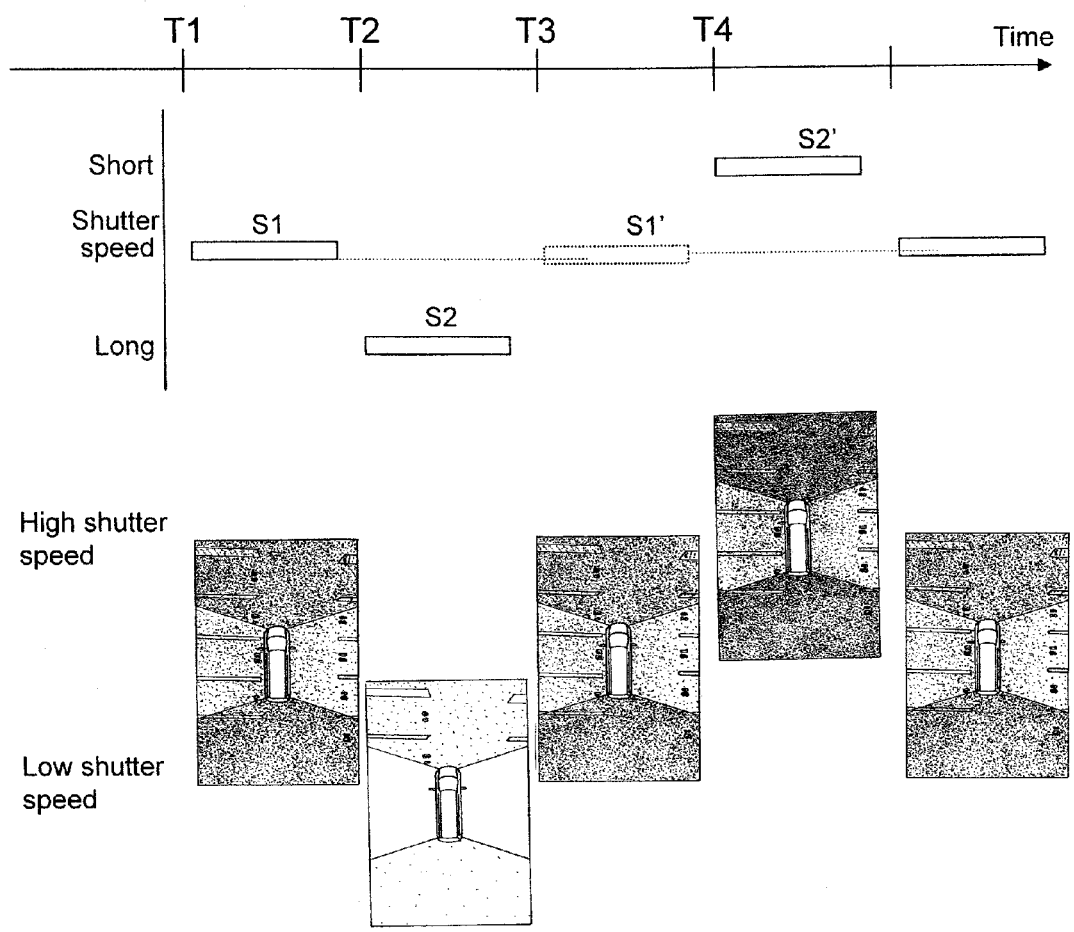
FIG. 17 is a diagram showing another scheme for changing shutter speed.

By making adjustments so that the average value of optimal shutter speed would fall between shutter speeds S1 and S2, it is possible to detect recognition targets with respect to images with a high dynamic range. It is noted that in cases where a recognition result is obtained at shutter speed S1, but no recognition result whatsoever is obtained at shutter speed S2, if, for example, assuming ΔS=S2−S1, the situation would be as in FIG. 17, where it is possible to capture images at a shutter speed at which recognition results are obtained, while at the same time alternately taking images at, as compared thereto, a shorter shutter speed and a longer shutter speed, and to search for suitable shutter speeds, and there is an effect whereby the search for shutter speed stabilizes. Further, if no recognition results are obtained at all at both shutter speeds S1 and S2, there is both a possibility that the shutter speed setting is significantly off, as well as a possibility that no recognition target is present within the image. Thus, in such cases, the shutter speed may be reset to some typical value.

Figure 19:
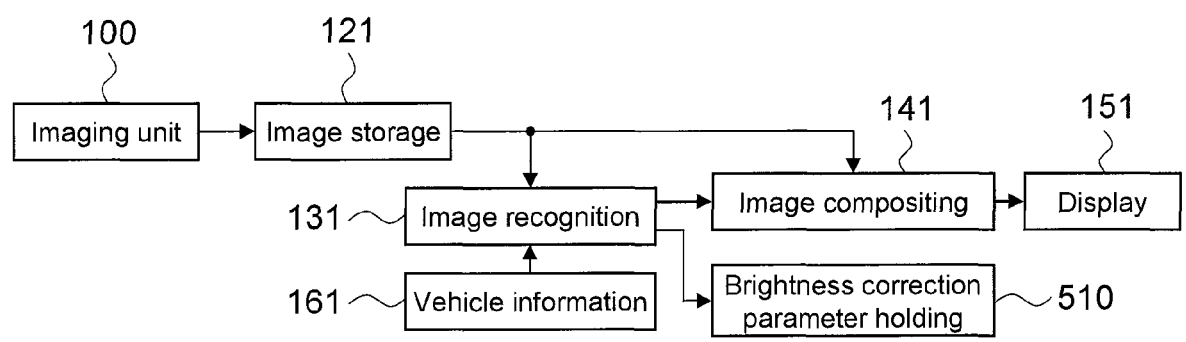
FIG. 19 is a configurational diagram where a brightness correction parameter of image recognition is used in place of physical shutter control.

It is noted that, up to this point, there has been described a configuration where shutter speed is physically changed. However, the configuration may just as well be one in which, for example, the coefficient of gamma transform, or the threshold of binarization or edge detection is changed. In other words, processing may be executed while sequentially changing the threshold for when it is assumed that an image of a greater exposure amount is inputted and the coefficient of gamma transform and the threshold for when it is assumed that an image of a lesser exposure amount is inputted. For example, as shown in FIG. 19, the configuration may also be such that a brightness correction parameter holding unit 510 is provided, and that there are held plural parameters for correcting the exposure amount of an image during image recognition by the image recognition unit 131.

Figure 4:
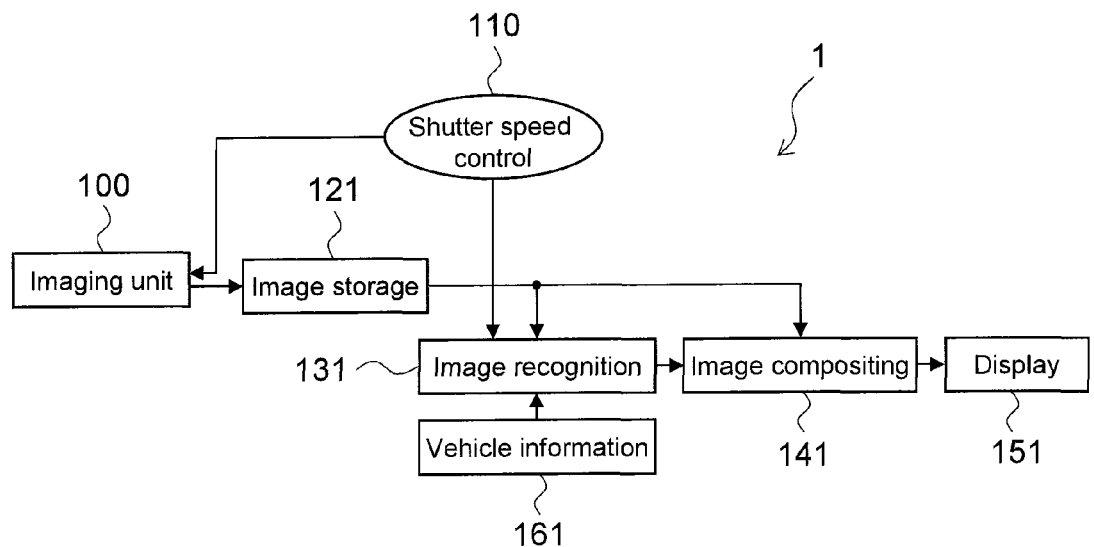
FIG. 4 is a diagram showing a configuration in a case where no control signal can be supplied to a shutter speed control unit.

FIG. 4 is a block diagram showing a modification example of FIG. 3. The periphery check assisting device 1 shown in FIG. 4 is of such a configuration that no control can be effected with respect to the shutter speed control unit 110. An explanation will be provided chiefly with respect to how it differs from FIG. 3. Unlike the configuration in FIG. 3, since there is no signal from the image recognition unit 131, the shutter speed control unit 110 sends plural pre-defined shutter speeds to the imaging unit 100 as well as to the image recognition unit 131.

Figure 5:
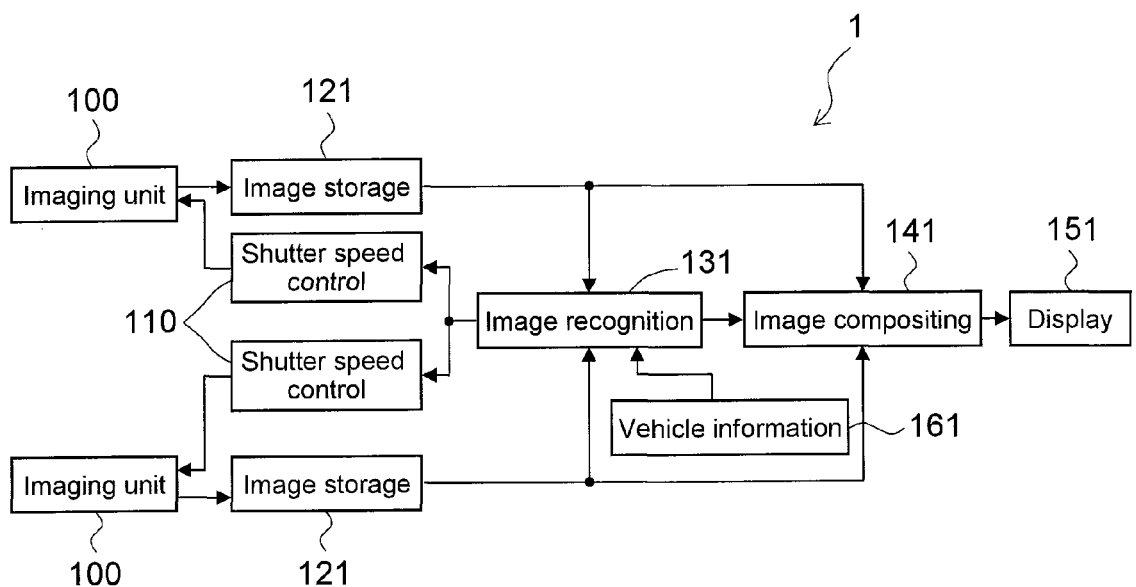
FIG. 5 is a diagram showing a configuration in a case where there are plural image storage units.

FIG. 5 is a block diagram showing another modification example of FIG. 3. The periphery check assisting device 1 shown in FIG. 5 has such a configuration that it comprises two each of the imaging unit 100, the shutter speed control unit 110, and the image storage unit 121. A description will be provided chiefly with respect to how it differs from FIG. 3. When the same target is being captured by the two imaging units 100, the image recognition unit 131 outputs control signals of differing shutter speeds to the respective shutter speed control units 110. Thus, plural images with differing exposure taken at the same time are obtained. It is noted that, since plural imaging units 100 cannot be placed within the exact same space, by using such image view point conversion as bird-view conversion or the like, it is possible to achieve the same effect as placing plural imaging units 100 at the same location. Thus, the present invention is applicable to both a configuration with one imaging unit, as well as to a configuration with plural imaging units.

Second Embodiment

Next, the second embodiment will be described below using FIG. 20 and FIG. 21. It is noted that like parts to those found in the first embodiment are designated with like reference numerals, while detailed descriptions thereof are herein omitted.

A feature of the present embodiment is that, first, a host vehicle periphery composite image is generated by joining and compositing images captured by plural imaging units and, next, image recognition is performed with respect to plural host vehicle periphery composite images whose exposure amounts are mutually different, and images of plural exposure amounts are composited in accordance with the recognition result.

Figure 20:
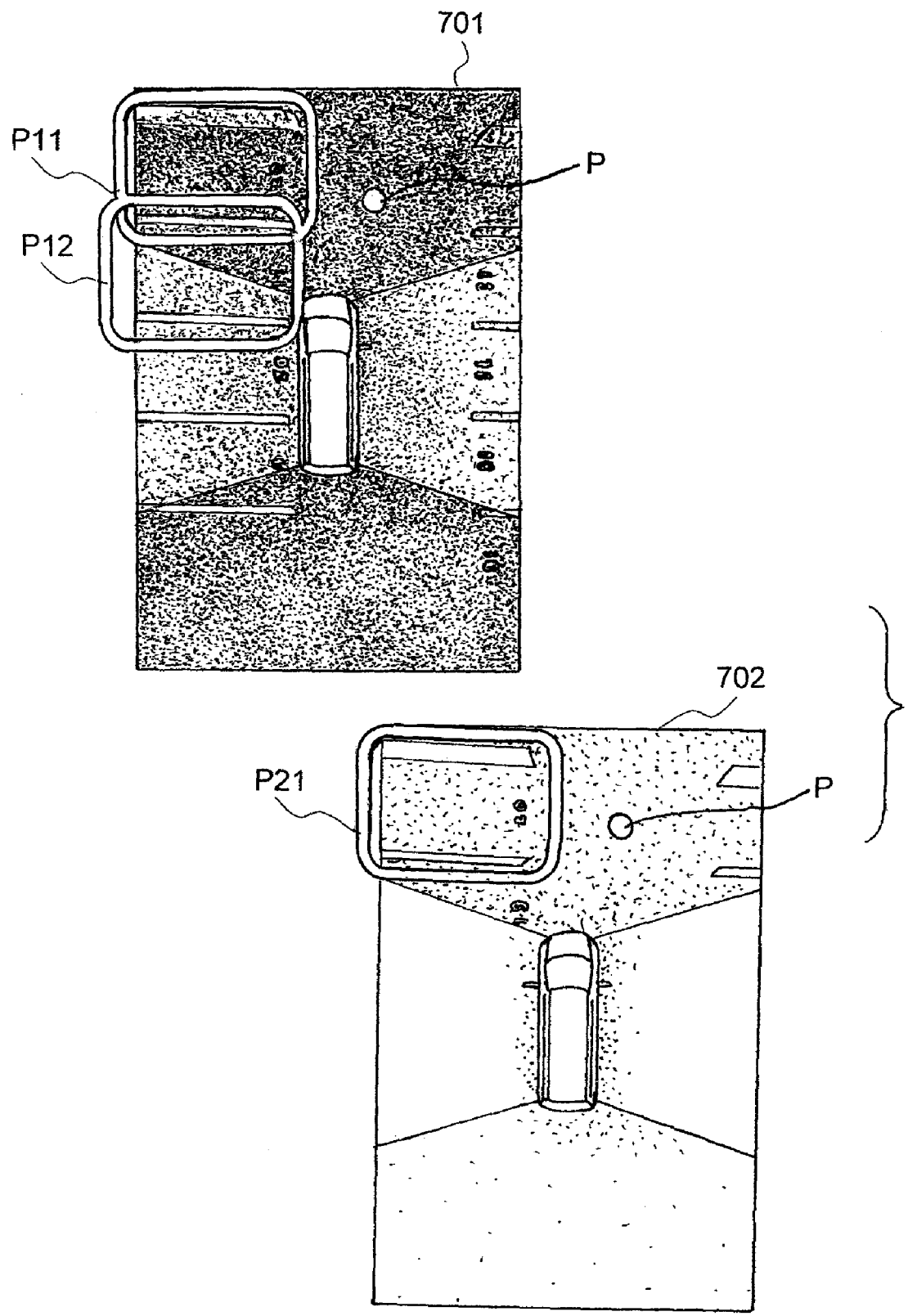
FIG. 20 is a diagram showing recognition results for parking frames.

A description will be provided using FIG. 20. First, plural images with mutually differing exposure amounts are captured at the respective imaging units 101-104. These plural images undergo distortion correction, and are joined and composited taking into account the relationship among the respective imaging units 101-104. For example, an image 701 is generated by joining and compositing four images with small exposure amounts captured by setting shutter speed to high speed. At the same time, an image 702 is generated by joining and compositing four images with large exposure amounts captured by setting shutter speed to low speed.

The image 701 and the image 702 are images in which the exposure amounts among the respective imaging units 101-104 are substantially coordinated. The fact that parking frame recognition is performed with respect to the images 701 and 702 and that an image of different exposure is generated in accordance with the result thereof is similar to the above-mentioned image compositing method for each camera image.

Figure 21:
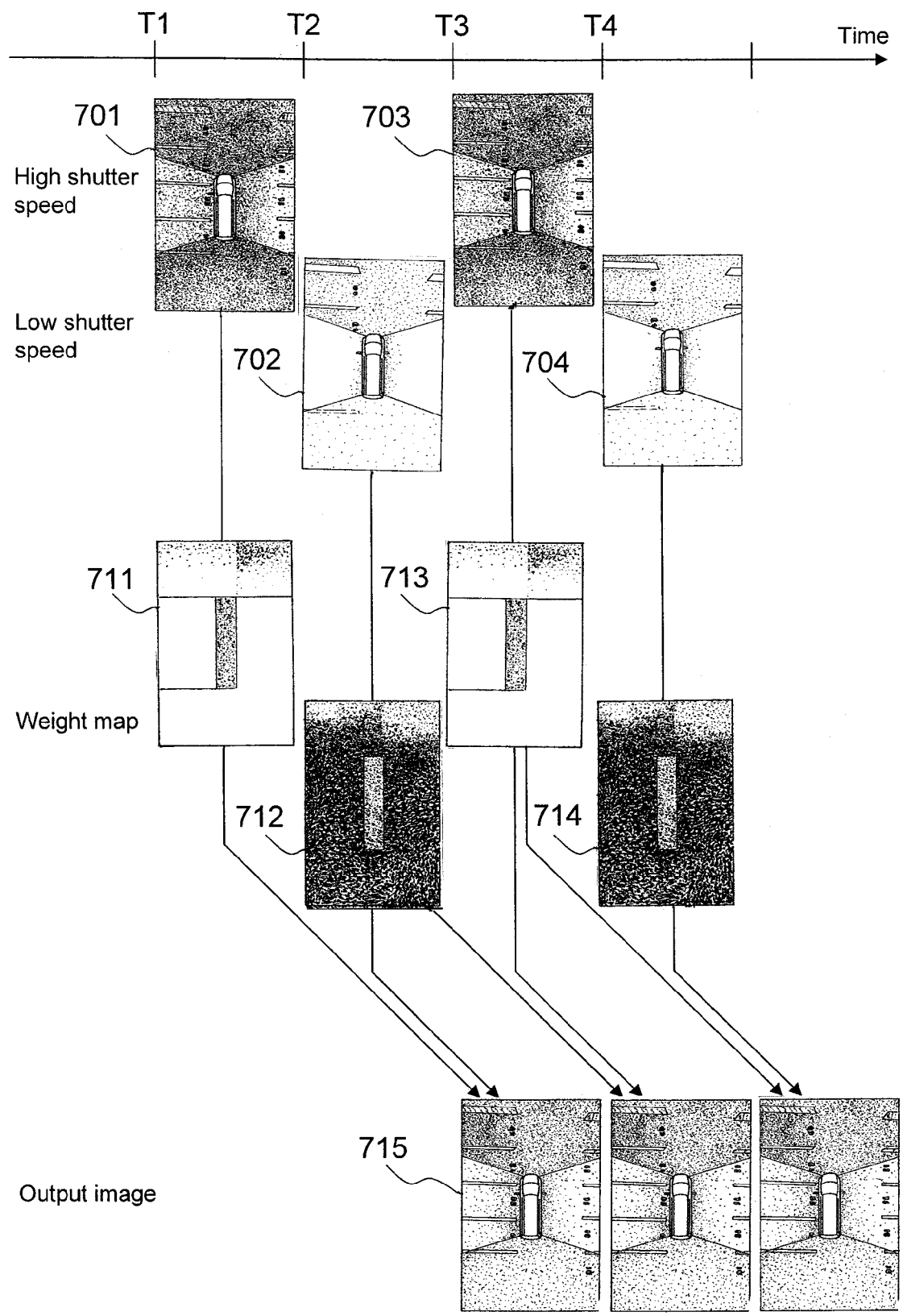
FIG. 21 is a diagram showing images with varying exposure times and weight maps thereof.

As shown in FIG. 21, by defining weight maps 711-714 with respect to the joined host vehicle periphery images, and weighting and adding the input images 701-704, an output image 715 is obtained.

Thus, in the present configuration, first, host vehicle periphery composite images are generated by joining and compositing images captured with the respective imaging units 101-104. Then, plural host vehicle periphery composite images with mutually differing exposure amounts are thereafter composited. Thus, there is an effect where, instead of local optimization, it is possible to optimize in such a manner as to make the appearance of the joined image be in a smooth and natural state overall.

Third Embodiment

Next, the third embodiment will be described below.

In this embodiment, a description will be provided with respect to a case where the target of interest is a moving body (a pedestrian) that is moving in the periphery of the host vehicle.

Because parking operations, which entail repeated forward and backward movements as well as sharp turns at large steering angles, involve many blind spots in the periphery of the host vehicle and an increase in the difference between the radii of the arcs followed by the inner wheels during turns, they often elicit accidents and require that attention be paid to walls and pedestrians all around. In order to perform such parking operations safely, what a driver should be particularly mindful of are pedestrians (hereinafter referred to as moving bodies) that move in the periphery of the host vehicle.

The contrast between a moving body and a road surface is generally lower than the contrast between white lines of a parking frame and a road surface. Therefore, when images are composited simply on the basis of the contrast of a given area range as is done in conventional techniques, there is a problem in that an image with poor contrast for targets the driver should be mindful of is generated. If the target of interest is stationary, this problem may be solved by the first embodiment described above. However, if the object is in motion, the first embodiment cannot be applied as is.

In the present embodiment, a recognition process is performed on each of images obtained at plural exposure amounts. A moving body is tracked, and even when recognition is unsuccessful, the position to which it has moved is estimated. By appropriately adjusting the brightness and contrast of the estimated position, it is possible to generate an image with high visibility. It is noted that the camera arrangement and the device configuration, per se, are similar to those in the first embodiment, and descriptions thereof are therefore omitted herein.

<Process Flow (Basic Portion)>

A process flow in the present embodiment will be described chiefly with respect to where it differs from that in the first embodiment. First, the imaging units 101-104 capture images of the periphery of the vehicle at varying times and plural varying exposures as specified by the shutter speed control units 111-114. The obtained images and the parameters at the time of capture are sent to and stored in the image storage unit 121.

Next, the images stored in the image storage unit 121 are sent to the image recognition unit 131, and a moving body recognition process is executed. By performing binarization at an appropriate threshold using a background subtraction method when the host vehicle is stationary, this moving body recognition is capable of extracting an area where a change occurred as a moving body area. When the host vehicle is in motion, by detecting the motion vector of the image using an optical flow method and performing segmentation based on the direction and size of that motion vector, it is possible to separate and derive a road surface area and a moving body area.

This moving body recognition is performed on images of plural varying exposure amounts. However, with respect to images whose shutter speed control is inappropriate relative to the environment in the periphery of the host vehicle, since luminance values are saturated on the bright or dark side, no difference or motion vector is extracted. When there is an unrecognizable image area in an image of given exposure, this signifies either the fact no moving body is present in this area or the fact that, due to inappropriate exposure adjustment, the area was not of a picture quality that allowed for recognition.

In addition, on the bases of the contrast within the moving body area, the extracted moving body shape, and the like, the image recognition unit 131 computes the accuracy of moving body recognition. The position at which the moving body is present as detected from an image of given exposure, and the accuracy of the detected moving body are obtained from the image recognition unit 131 as outputs.

On the bases of the image area at which the moving body is present as recognized at the image recognition unit 131 and of the accuracy of that recognition, that is, the level of visibility, images of varying exposure amounts are composited at the image compositing unit 141. The shutter speed control units 111-114 send signals for capturing images by controlling the imaging units 101-104 so as to adjust shutter speed in accordance with signals from the image recognition unit 131. At the image compositing unit 141, an image is composited based on the result from the image recognition unit 131 and sent to the display unit 151, where the composite image is displayed.

<Details of Moving Body Recognition Accuracy Computation Method>

The accuracy of moving body recognition may be defined as the sum of accuracy Rimg of image quality information and accuracy Rstr of shape information of the recognition target.

Accuracy Rimg of image quality information may be defined by way of the contrast within and near the moving body area and the complexity of texture. Taking, for example, an area which is the moving body area expanded by 10% or so, the contrast within and near the moving body area may be defined as the ratio of maximum luminance value Ymax contained in this area to minimum luminance value Ymin, that is, Ymax/Ymin. By calculating the energy, entropy, correlation, local homogeneity, moment, etc., within the moving body area through a co-occurrence matrix, and using the average, dispersion, histogram symmetry (skew), and histogram acutance of luminance values of pixels of the moving body area, the complexity of texture is so defined that the values become greater with increased complexity. As these are common image processing methods, detailed descriptions are omitted herein.

Figure 7:
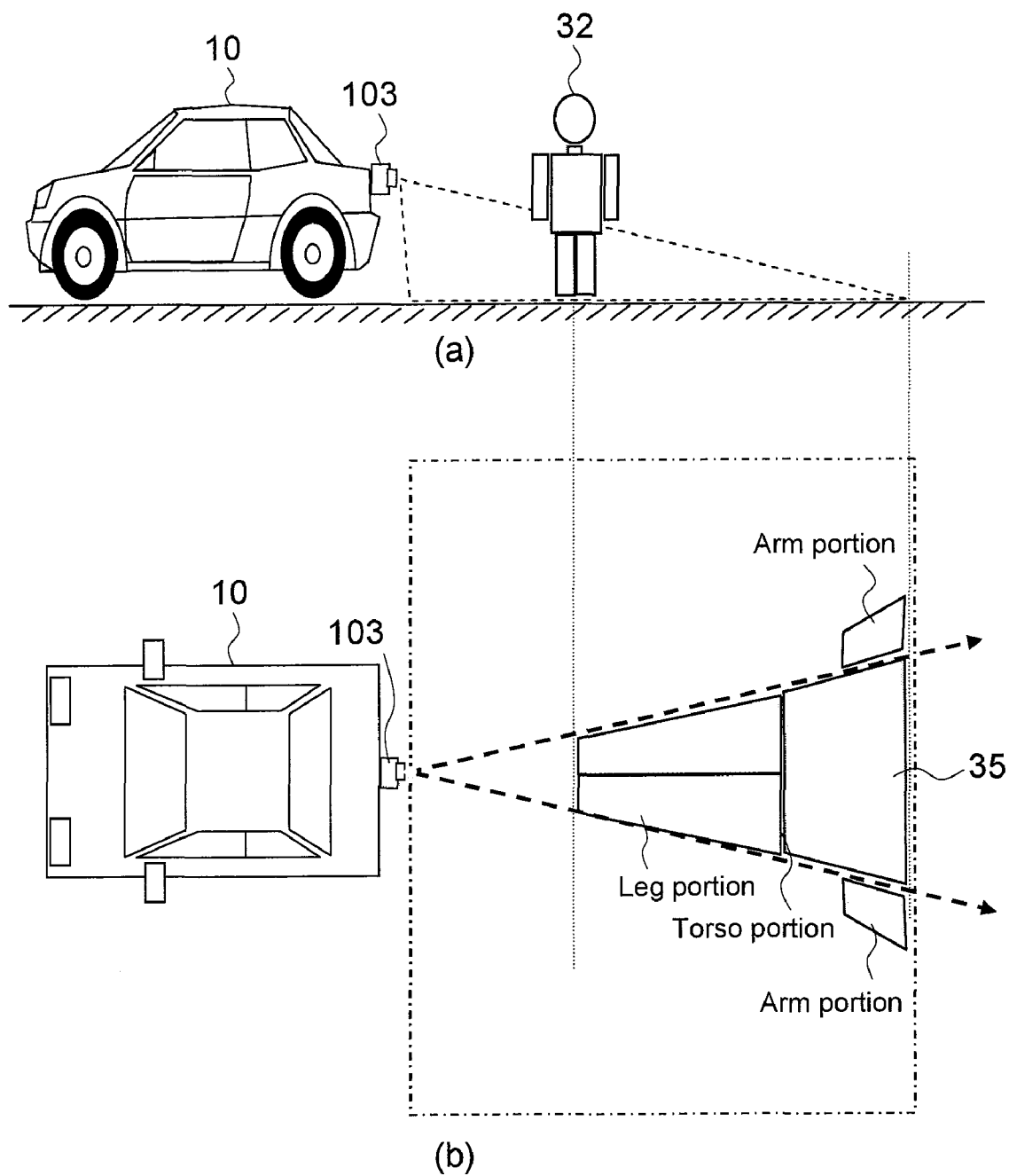
FIGS. 7(a) and (b) are diagrams showing how a person would appear in a bird-view image.

Accuracy Rstr of shape information of the recognition target can be defined by way of the recognized shape of a person. For example, as shown in FIGS. 7(a) and (b), a person 32 standing behind the vehicle 10 with his/her legs closed (see FIG. 7(a)) is observed, in a bird-view image 38, as a fan-like shape 35 with his/her feet position as a point of reference (see FIG. 7(b)).

Specifically, the feet position lies in the plane of the ground surface, and can be converted into its size in real space from the size in the image. Accuracy Rstr may be so defined as to be higher when such shape and size agree with a model of a standard person's size.

For example, with respect to feet size, assuming that the conversion parameter between the image and real space is $\beta$ [cm/pixel], if feet size is observed as being w [pixels] in the image, then feet size f [cm] in real space would be $f=\beta \times w$. Assuming that the standard value is 25 cm and that it generally lies within the range of $20 \leq f \leq 30$, accuracy Rfoot of shape information with respect to feet size is taken to be zero when both of the following conditions are satisfied: $Rfoot=5-|\beta \times w-25|$ and $|\beta \times w-25|>5$.

Thus, accuracy Rimg of image quality information and accuracy Rstr of structure information of the recognition target assume greater values when visibility is good. It is possible to thus define and compute the accuracy of moving body recognition.

It is noted that the present invention is by no means limited to the embodiments described above, and various modifications may be made without departing from the spirit and scope of the present invention.

What is claimed is:

1. Apparatus for vehicle surroundings monitoring that assists checking of surroundings of a vehicle by a driver by displaying an image captured outside of the vehicle, the apparatus comprising:
    an imaging unit that captures a predetermined range around the vehicle with mutually differing exposure amounts;
    an image recognition unit that performs recognition of a predefined recognition target by image processing plural images with mutually differing exposure amounts that are captured by the imaging unit;
    an image compositing unit that generates a composite image from the images based on a recognition result of the image recognition unit; and
    a display unit that displays the composite image composited by the image compositing unit,
    wherein the image compositing unit compares, with each or one another, plural images within which the recognition target has been recognized by the image recognition unit, extracts from each of the plural images an image area where accuracy of the recognition target is high, and generates the composite image using the extracted image areas, and
    wherein the image compositing unit creates, in accordance with the accuracy of the recognition target and a distance from an area where the recognition target is detected, a weight map defining a proportion with which each of the image areas is to be used in the generation of the composite image, and generates the composite image in accordance with the weight map.

2. The apparatus for vehicle surroundings monitoring according to claim 1, wherein the image compositing unit generates the composite image by mixing a luminance value and color information of each pixel of the plural images in accordance with the weight map.

3. The apparatus for vehicle surroundings monitoring according to claim 1, further comprising a vehicle information providing unit that computes, based on predetermined vehicle information, a relative host vehicle position in each of the images captured by the imaging unit, wherein
    the image compositing unit generates the composite image using information on the host vehicle position computed by the vehicle information providing unit.

4. The apparatus for vehicle surroundings monitoring according to claim 3, wherein the vehicle information includes at least one of: vehicle speed; wheel speed; steering angle; wheel angle; stop lamp activation information; headlamp activation information; wiper activation information; and host vehicle position information by a host vehicle positioning system.

5. The apparatus for vehicle surroundings monitoring according to claim 1, further comprising a shutter speed control unit that controls a shutter speed of the imaging unit based on the recognition result of the image recognition unit.

6. The apparatus for vehicle surroundings monitoring according to claim 5, further comprising an exposure amount information holding unit that stores information on exposure amount of each of the images captured by the imaging unit, wherein
    the shutter speed control unit controls the shutter speed of the imaging unit based on the information on exposure amount that is stored in the exposure amount information holding unit and on the recognition result of the image recognition unit.

7. The apparatus for vehicle surroundings monitoring according to claim 1, comprising plural imaging units, wherein plural images of mutually differing exposure amounts are obtained at each of the imaging units.

8. The apparatus for vehicle surroundings monitoring according to claim 1, wherein the plural images with mutually differing exposure amounts are obtained by capturing with the same imaging unit plural times.

9. The apparatus for vehicle surroundings monitoring according to claim 1, further comprising a target tracking unit that tracks a moving body based on the recognition result by the image recognition unit, and estimates a moved position of the moving body even when recognition by the image recognition unit is unsuccessful.

10. The apparatus for vehicle surroundings monitoring according to claim 9, wherein the target tracking unit chronologically tracks the moving body recognized by the image recognition unit and estimates movement of the moving body.

11. The apparatus for vehicle surroundings monitoring according to claim 1, wherein the plural images with mutually differing exposure amounts are generated by capturing with the same imaging unit plural times, and accumulating the captured images.

12. The apparatus for vehicle surroundings monitoring according to claim 1, wherein the plural images with mutually differing exposure amounts are captured and generated by plural imaging units.

* * * * *